US008472412B2

(12) United States Patent
Naka et al.

(10) Patent No.: US 8,472,412 B2
(45) Date of Patent: *Jun. 25, 2013

(54) BASE STATION DEVICE, AND MOBILE STATION DEVICE

(75) Inventors: Katsuyoshi Naka, Osaka (JP); Hiroki Haga, Miyagi (JP); Hidenori Matsuo, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/070,315

(22) Filed: Mar. 23, 2011

(65) Prior Publication Data

US 2011/0170509 A1 Jul. 14, 2011

Related U.S. Application Data

(62) Division of application No. 11/994,626, filed as application No. PCT/JP2006/313428 on Jul. 5, 2006.

(30) Foreign Application Priority Data

Jul. 7, 2005 (JP) ................................ 2005-198608

(51) Int. Cl.
H04B 7/216 (2006.01)

(52) U.S. Cl.
USPC ........................... 370/335; 370/342; 370/350

(58) Field of Classification Search
None
See application file for complete search history.

(56) References Cited

U.S. PATENT DOCUMENTS

| 6,310,869 | B1 * | 10/2001 | Holtzman et al. | 370/335 |
| 6,504,830 | B1 * | 1/2003 | Ostberg et al. | 370/342 |
| 6,782,041 | B1 | 8/2004 | Aihara | |
| 7,072,318 | B2 * | 7/2006 | Shoji et al. | 370/335 |
| 7,130,293 | B2 * | 10/2006 | Hanada et al. | 370/342 |
| 7,154,973 | B2 * | 12/2006 | Hanada et al. | 375/354 |

(Continued)

FOREIGN PATENT DOCUMENTS

| EP | 1028552 | 8/2000 |
| JP | 2000/138657 | 5/2000 |

(Continued)

OTHER PUBLICATIONS

International Search Report dated Jul. 25, 2006.

(Continued)

Primary Examiner — Steven H Nguyen
(74) Attorney, Agent, or Firm — Seed IP Law Group PLLC

(57) ABSTRACT

Provided are a base station device and a mobile station device, which can lighten a cell-search processing. The base station device (100) includes a frame constitution unit (130) for forming a frame, in which a pilot symbol multiplied by a base station scrambling code assigned to that device and a plurality of sequences contained in the corresponding sequence set is arranged in at least the head or tail, and a radio transmission unit (155) for sending the formed frame. On the receiving side of the frame, the frame timing can be detected from the position of a pilot symbol contained in that frame. Since the base station scrambling code and the sequence set containing the sequences are made to correspond to each other, candidates can be narrowed to at most the base station scrambling codes of the number of the combinations of the sequences contained in the sequence set, by detecting the sequences multiplied by the pilot symbol, so that the cell search processing can be lightened.

9 Claims, 19 Drawing Sheets

U.S. PATENT DOCUMENTS

| | | | |
|---|---|---|---|
| 7,218,617 B1* | 5/2007 | Usuda et al. | 370/320 |
| 7,266,167 B2* | 9/2007 | Murakami et al. | 375/347 |
| 7,372,889 B2* | 5/2008 | Atarashi et al. | 375/130 |
| 7,386,055 B2 | 6/2008 | Morita | |
| 7,460,506 B2* | 12/2008 | Ro et al. | 370/335 |
| 7,688,901 B2* | 3/2010 | Murakami et al. | 375/260 |
| 7,746,938 B2* | 6/2010 | Hasegawa et al. | 375/260 |
| 7,768,979 B2* | 8/2010 | Sutivong et al. | 370/334 |
| 2002/0041579 A1* | 4/2002 | Tanno et al. | 370/335 |
| 2002/0041580 A1* | 4/2002 | Shoji et al. | 370/335 |
| 2003/0152178 A1 | 8/2003 | Tanno | |
| 2004/0085946 A1* | 5/2004 | Morita et al. | 370/342 |
| 2004/0190598 A1* | 9/2004 | Seki et al. | 375/141 |
| 2004/0240571 A1* | 12/2004 | Murakami et al. | 375/260 |
| 2004/0246998 A1* | 12/2004 | Ma et al. | 370/527 |
| 2004/0252629 A1* | 12/2004 | Hasegawa et al. | 370/208 |
| 2005/0157637 A1 | 7/2005 | Feng et al. | |
| 2005/0239459 A1* | 10/2005 | Katoh | 455/432.1 |
| 2005/0265293 A1* | 12/2005 | Ro et al. | 370/335 |
| 2009/0323642 A1 | 12/2009 | Tanno | |

FOREIGN PATENT DOCUMENTS

| | | |
|---|---|---|
| JP | 2003-179522 | 6/2003 |
| JP | 2003/244763 | 8/2003 |
| JP | 2007-221743 | 8/2007 |
| WO | 00/77943 | 12/2000 |

OTHER PUBLICATIONS

Japanese Office Action dated Dec. 15, 2009.

M. Tanno et al., "Three-Step Fast Celt Search Algorithm utilizing Common Pilot Channel for Forward Link Broadband OFCDM Packet Wireless Access," Technical Report of IEICE, RCS 2002-40, Apr. 2002, pp. 135-140.

M. Mouri at al., "Joint symbol-timing and frequency offset estimation scheme for multi-carrier modulation system," Technical Report of IEICE, RCS95-70, Sep. 1995, pp. 9-16.

NTT DoCoMo et al., Cell Search Time Performance of Three-Step Cell Search Method, 3GPP TSG-RAN WG1 R1-060781, 2006.03, Internet <URL:http://www.3gpp.org/ftp/tsg_ran/WG1_L1/TSGR1_44bis/Docs/R1_060 781.zip>.

Minori Morita et al., "Optimization of Pilot Channel and Performance of 4-step Cell Search Algorithm for OFDM Wireless Access in Forward Link." Technical Report of IEICE, vol. 104 No. 594, pp. 109-114, Jan. 2005., with partial English translation.

Notice of the Reasons for Rejection, dated Feb. 21, 2012, for corresponding Japanese Application No. 2011-226825, 3 pages.

Tanno et al., "Field Experiments on Three-Step Fast Cell Search Algorithm Employing Common Pilot Channel for OFCDM Broadband Wireless Access in Forward Link," Technical Report of IEICE, The Institute of Electronics, Information and Communication Engineers, C52004-146, RCS2004-253(Jan. 2005), 2005, 8 pages.

* cited by examiner

| SCRAMBLING CODE NUMBER | CODE GROUP SEQUENCE SET | | SCRAMBLING CODE NUMBER | CODE GROUP SEQUENCE SET | | SCRAMBLING CODE NUMBER | CODE GROUP SEQUENCE SET | |
|---|---|---|---|---|---|---|---|---|
| C1 | CG1 | CG1 | C17 | CG2 | CG1 | C33 | CG3 | CG1 |
| C2 | CG1 | CG2 | C18 | CG2 | CG2 | C34 | CG3 | CG2 |
| C3 | CG1 | CG3 | C19 | CG2 | CG3 | C35 | CG3 | CG3 |
| C4 | CG1 | CG4 | C20 | CG2 | CG4 | C36 | CG3 | CG4 |
| C5 | CG1 | CG5 | C21 | CG2 | CG5 | C37 | CG3 | CG5 |
| C6 | CG1 | CG6 | C22 | CG2 | CG6 | C38 | CG3 | CG6 |
| C7 | CG1 | CG7 | C23 | CG2 | CG7 | C39 | CG3 | CG7 |
| C8 | CG1 | CG8 | C24 | CG2 | CG8 | C40 | CG3 | CG8 |
| C9 | CG1 | CG9 | C25 | CG2 | CG9 | C41 | CG3 | CG9 |
| C10 | CG1 | CG10 | C26 | CG2 | CG10 | C42 | CG3 | CG10 |
| C11 | CG1 | CG11 | C27 | CG2 | CG11 | C43 | CG3 | CG11 |
| C12 | CG1 | CG12 | C28 | CG2 | CG12 | C44 | CG3 | CG12 |
| C13 | CG1 | CG13 | C29 | CG2 | CG13 | C45 | CG3 | CG13 |
| C14 | CG1 | CG14 | C30 | CG2 | CG14 | C46 | CG3 | CG14 |
| C15 | CG1 | CG15 | C31 | CG2 | CG15 | C47 | CG3 | CG15 |
| C16 | CG1 | CG16 | C32 | CG2 | CG16 | C48 | CG3 | CG16 |

FIG.4

| SCRAMBLING CODE NUMBER | CODE GROUP SEQUENCE SET | | SCRAMBLING CODE NUMBER | CODE GROUP SEQUENCE SET | | SCRAMBLING CODE NUMBER | CODE GROUP SEQUENCE SET | |
|---|---|---|---|---|---|---|---|---|
| | SUBCARRIER BLOCK 1 | SUBCARRIER BLOCK 2 | | SUBCARRIER BLOCK 1 | SUBCARRIER BLOCK 2 | | SUBCARRIER BLOCK 1 | SUBCARRIER BLOCK 2 |
| C1 | CG1 | CG1 | C17 | CG2 | CG1 | C33 | CG3 | CG1 |
| C2 | CG1 | CG2 | C18 | CG2 | CG2 | C34 | CG3 | CG2 |
| C3 | CG1 | CG3 | C19 | CG2 | CG3 | C35 | CG3 | CG3 |
| C4 | CG1 | CG4 | C20 | CG2 | CG4 | C36 | CG3 | CG4 |
| C5 | CG1 | CG5 | C21 | CG2 | CG5 | C37 | CG3 | CG5 |
| C6 | CG1 | CG6 | C22 | CG2 | CG6 | C38 | CG3 | CG6 |
| C7 | CG1 | CG7 | C23 | CG2 | CG7 | C39 | CG3 | CG7 |
| C8 | CG1 | CG8 | C24 | CG2 | CG8 | C40 | CG3 | CG8 |
| C9 | CG1 | CG9 | C25 | CG2 | CG9 | C41 | CG3 | CG9 |
| C10 | CG1 | CG10 | C26 | CG2 | CG10 | C42 | CG3 | CG10 |
| C11 | CG1 | CG11 | C27 | CG2 | CG11 | C43 | CG3 | CG11 |
| C12 | CG1 | CG12 | C28 | CG2 | CG12 | C44 | CG3 | CG12 |
| C13 | CG1 | CG13 | C29 | CG2 | CG13 | C45 | CG3 | CG13 |
| C14 | CG1 | CG14 | C30 | CG2 | CG14 | C46 | CG3 | CG14 |
| C15 | CG1 | CG15 | C31 | CG2 | CG15 | C47 | CG3 | CG15 |
| C16 | CG1 | CG16 | C32 | CG2 | CG16 | C48 | CG3 | CG16 |

FIG.17

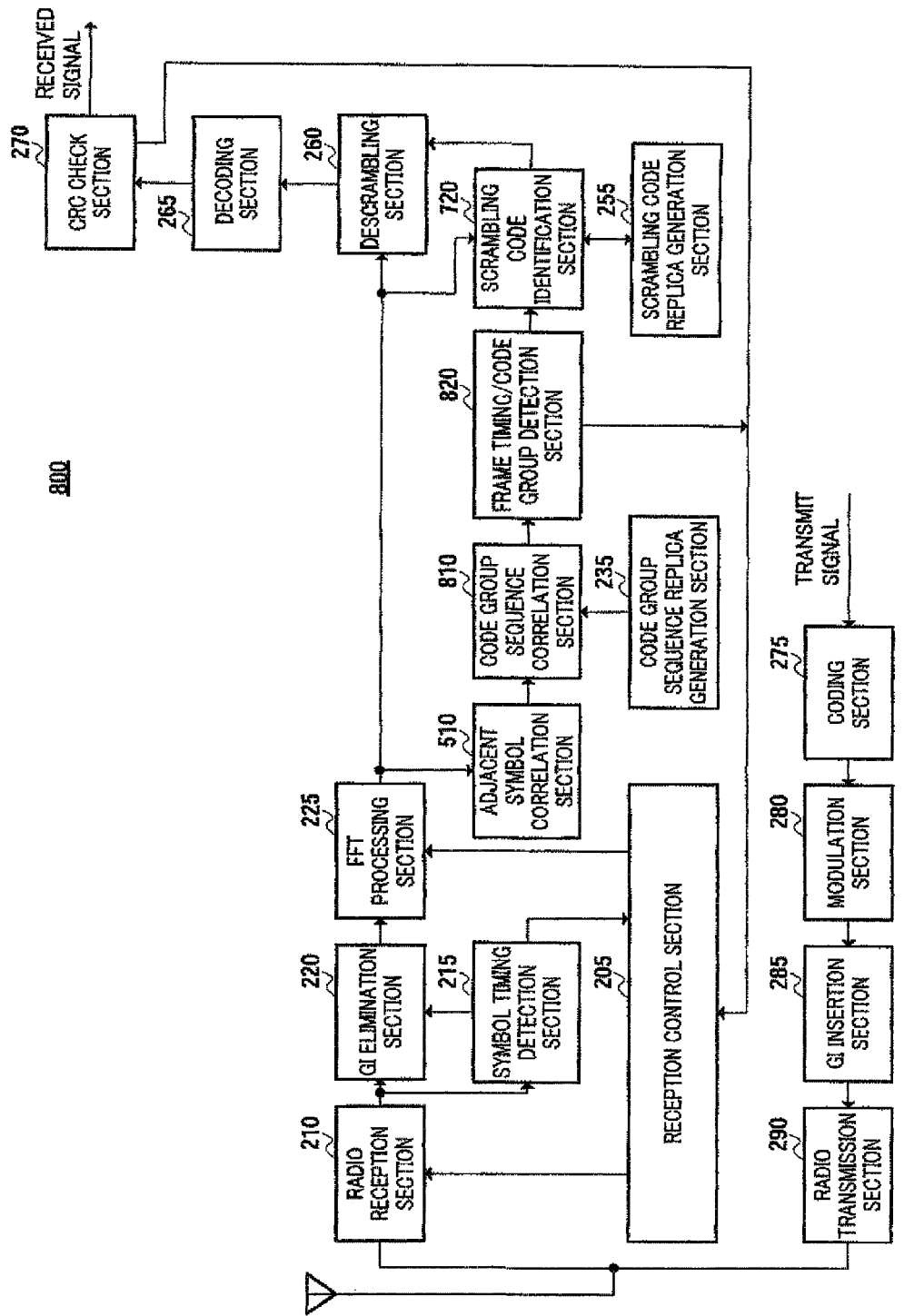

BASE STATION DEVICE, AND MOBILE STATION DEVICE

This is a divisional application of application Ser. No. 11/994,626 filed Jan. 3, 2008, which is a national stage of PCT/JP2006/313428 filed Jul. 5, 2006, which is based on Japanese Application No. 2005-198608 filed Jul. 7, 2005, the entire contents of each which are incorporated by reference herein.

TECHNICAL FIELD

The present invention relates to a base station apparatus and a mobile station apparatus that performs a cell search based on a signal from that base station apparatus.

BACKGROUND ART

When powered on or during handover, a mobile station such as a mobile phone can communicate by appropriately selecting and using a cell (base station). Selection of a cell by a mobile station is called a cell search. In a cell search, a mobile station selects the optimal cell to be connected to when powered on. Specifically, each cell is identified by a unique scrambling code, and a cell search is performed by a mobile station detecting the scrambling code of the cell that transmits the signal with the greatest received power in a downlink.

A conventional technology related to this is a three-step initial cell search method in OFCDM (Orthogonal Frequency and Code Division Multiplexing) (see Patent Document 1, for example).

With the conventional technology described in Patent Document 1, scrambling codes can be fast detected by grouping scrambling codes into a number of groups. Specifically, in the first step, symbol timing is detected by means of guard interval correlation; in the second step, frame timing and a code group are simultaneously detected by calculating correlations between temporally adjacent OFDM symbols; and in the third step, a scrambling code is identified by means of correlation calculation from between pilot symbol and scrambling code candidates belonging to the code group detected in the second step.

FIG. 1 shows a conventional OFCDM frame configuration. As shown in FIG. 1, there are consecutive pilot symbols in the time domain at a frame boundary, and a code group sequence indicating a scrambling code group is multiplied by a frame-end pilot symbol.

FIG. 2 shows conventional second-step processing of a cell search performed by a mobile station. The mobile station performs frame timing and scrambling code group detection by calculating correlations between a sequence extracted by differential demodulation between adjacent symbols and a code group sequence of all code group candidates. A code group and frame timing are detected simultaneously by detecting the code group and timing for which the maximum correlation value between these adjacent pilot symbols is calculated.

Patent Document 1: Unexamined Japanese Patent Publication No. 2003-244763

DISCLOSURE OF INVENTION

Problems to be Solved by the Invention

However, a problem with the conventional technology is that, since a scrambling code group is identified using all code group candidates in the second step, and a scrambling code is identified in the third step by calculating correlations using all scrambling code candidates belonging to the identified scrambling code group, there is an increased amount of calculation until scrambling code identification.

It is an object of the present invention to provide a base station apparatus and mobile station apparatus that enable cell search processing to be alleviated.

Means for Solving the Problems

A base station apparatus of the present invention employs a configuration that includes: a frame forming section that forms a frame by arranging a pilot symbol multiplied by a plurality of sequences contained in a sequence set corresponding to a code group to which a base station scrambling code assigned to that apparatus belongs at at least the start or end; and a transmitting section that transmits the formed frame.

A mobile station apparatus of the present invention employs a configuration that includes: a receiving section that receives a frame in which a pilot symbol multiplied by a plurality of sequences contained in a sequence set corresponding to a code group to which a base station scrambling code belongs is arranged at least the start or end; a correspondence table in which the base station scrambling code and the sequence set are mutually associated; a correlation section that multiplies all the sequence candidates by the frame and calculates correlations; a sequence set detection section that detects frame timing and a plurality of sequences multiplied by the pilot symbol based on correlation values calculated by the correlation section; and a base station scrambling code detection section that identifies scrambling code candidates corresponding to the sequence set containing the detected sequences, and detects the base station scrambling code from among the scrambling code candidates.

Advantageous Effect of the Invention

According to the present invention, a base station apparatus and mobile station apparatus can be provided that enable cell search processing to be alleviated.

BRIEF DESCRIPTION OF DRAWINGS

FIG. 4 is a drawing showing a sample configuration of a correspondence table of Embodiment 1;

FIG. 17 is a drawing showing a sample configuration of correspondence table of Embodiment 5;

FIG. 19 is a block diagram showing the configuration of a mobile station apparatus according to Embodiment 6.

BEST MODE FOR CARRYING OUT THE INVENTION

Figure 1:
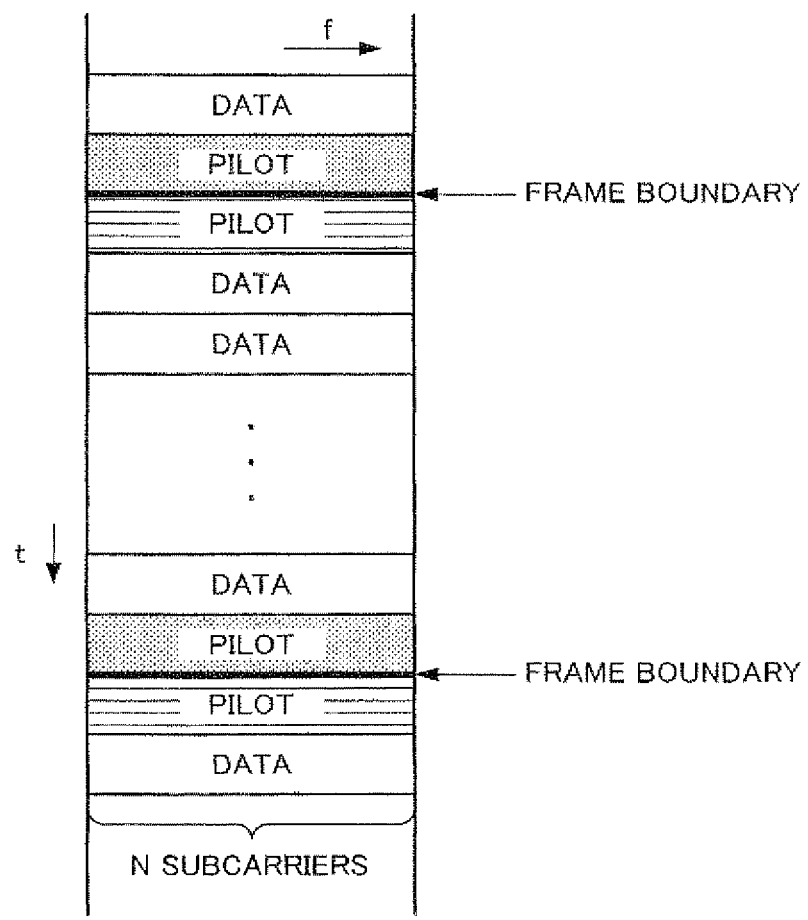
FIG. 1 is a drawing showing the transmission frame structure of a conventional base station apparatus.
Figure 2:
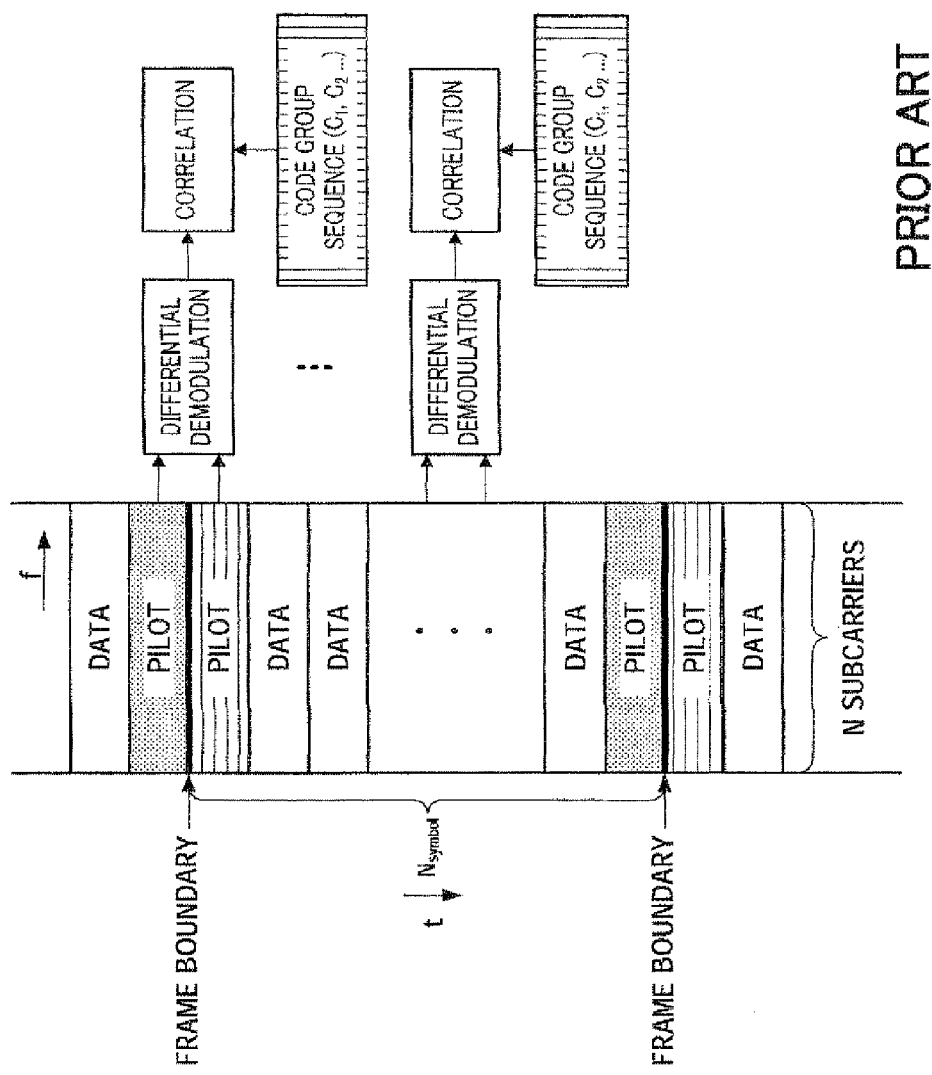
FIG. 2 is a drawing showing a cell search operation of a conventional mobile station apparatus.

Embodiments of the present invention will now be described in detail with reference to the accompanying drawings. In the embodiments, identical components are assigned the same reference numerals, and duplicate descriptions thereof are omitted.

(Embodiment 1)

Figure 3:
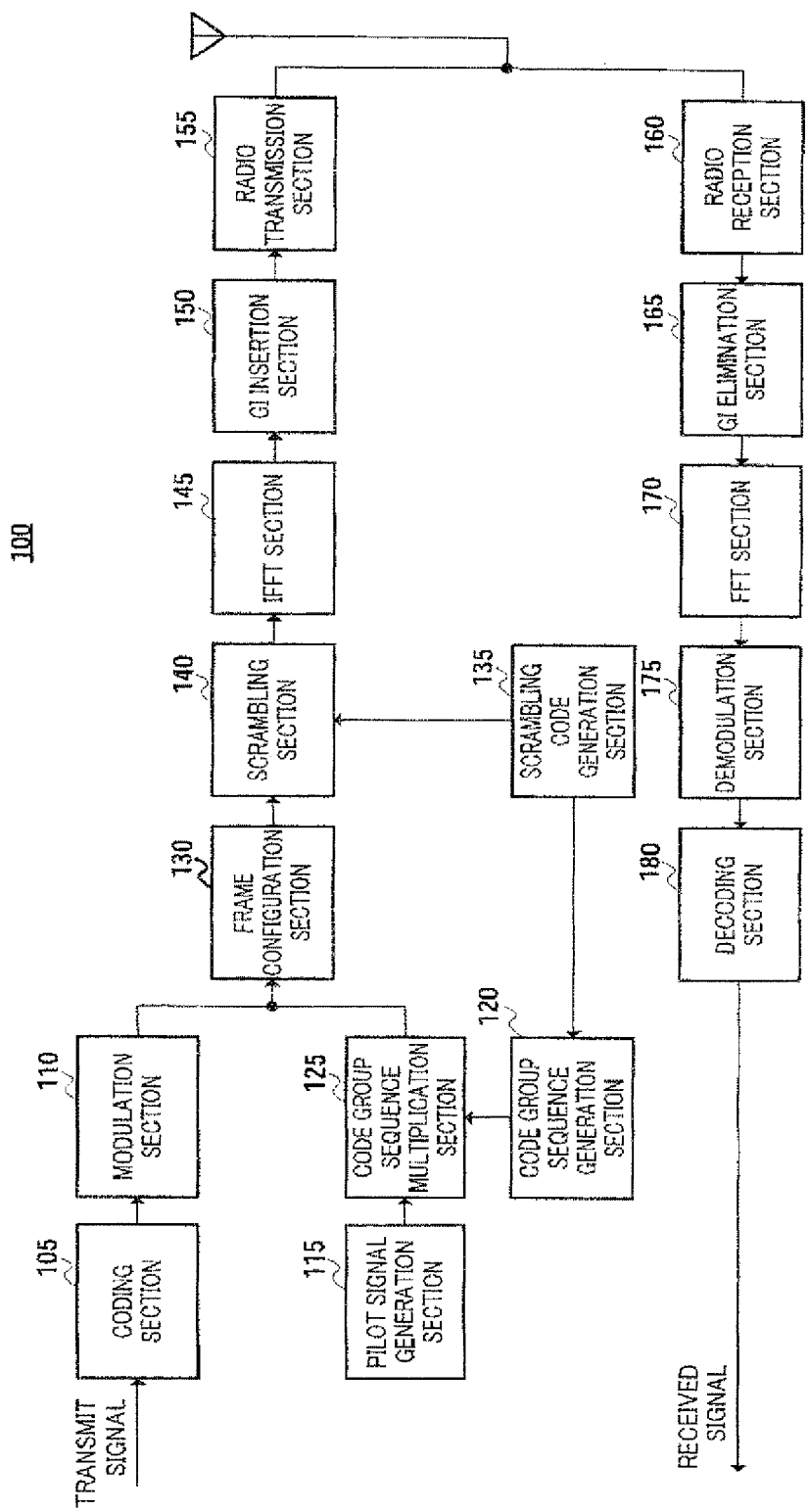
FIG. 3 is a block diagram showing the configuration of a base station apparatus according to Embodiment 1 of the present invention.

As shown in FIG. 3, a base station apparatus 100 of Embodiment 1 has a coding section 105, a modulation section 110, a pilot signal generation section 115, a code group sequence generation section 120, a code group sequence multiplication section 125, a frame configuration section 130, a scrambling code generation section 135, a scrambling section 140, an IFFT section 145, a GI insertion section 150, a radio transmission section 155, a radio reception section 160, a GI removal section 165, an FFT section 170, a demodulation section 175, and a decoding section 180.

Coding section 105 has a transmit signal (DCH or the like) as input, performs predetermined coding, and outputs a coded signal to modulation section 110.

Modulation section 110 has the coded signal from coding section 105 as input, performs predetermined primary modulation (generally, primary modulation according to the transmit signal QoS or radio channel state) in subcarrier units, and outputs a modulated signal to frame configuration section 130.

Pilot signal generation section 115 generates a pilot signal (CPICH) common to all cells, and outputs the generated pilot signal to code group sequence multiplication section 125.

Code group sequence generation section 120 has a scrambling code number as input from scrambling code generation section 135. Then code group sequence generation section 120 references a scrambling code number/code group sequence set correspondence table (see FIG. 4), and selects a code group sequence set to be multiplied by a frame-end pilot (CPICH). Code group sequence generation section 120 then outputs the selected scrambling code group sequence set to code group sequence multiplication section 125. Here, the correspondence table shown in FIG. 4 indicates the correspondence between a scrambling code unique to each base station apparatus 100 and a code group sequence set assigned to that scrambling code. This code group sequence set is composed of a plurality of code group sequences (which may be of one type). Code group sequences used in this embodiment are mutually-orthogonal orthogonal sequences. Here, code group sequences in a conventional system are used, but this is not a limitation, and any orthogonal sequences that are mutually orthogonal may be used. However, using orthogonal sequences already provided in a conventional system obviates the necessity of preparing orthogonal sequences for a system of this embodiment, enabling the system construction workload to be alleviated.

Code group sequence multiplication section 125 has a code group sequence set from code group sequence generation section 120 as input. Then code group sequence multiplication section 125 multiplies the pilot signal from pilot signal generation section 115 by all the code group sequences composing the code group sequence set. Code group sequence multiplication section 125 then outputs two sequences—the pilot signal itself, and a sequence in which the pilot signal has been multiplied by the code group sequences—to frame configuration section 130.

Figure 5:
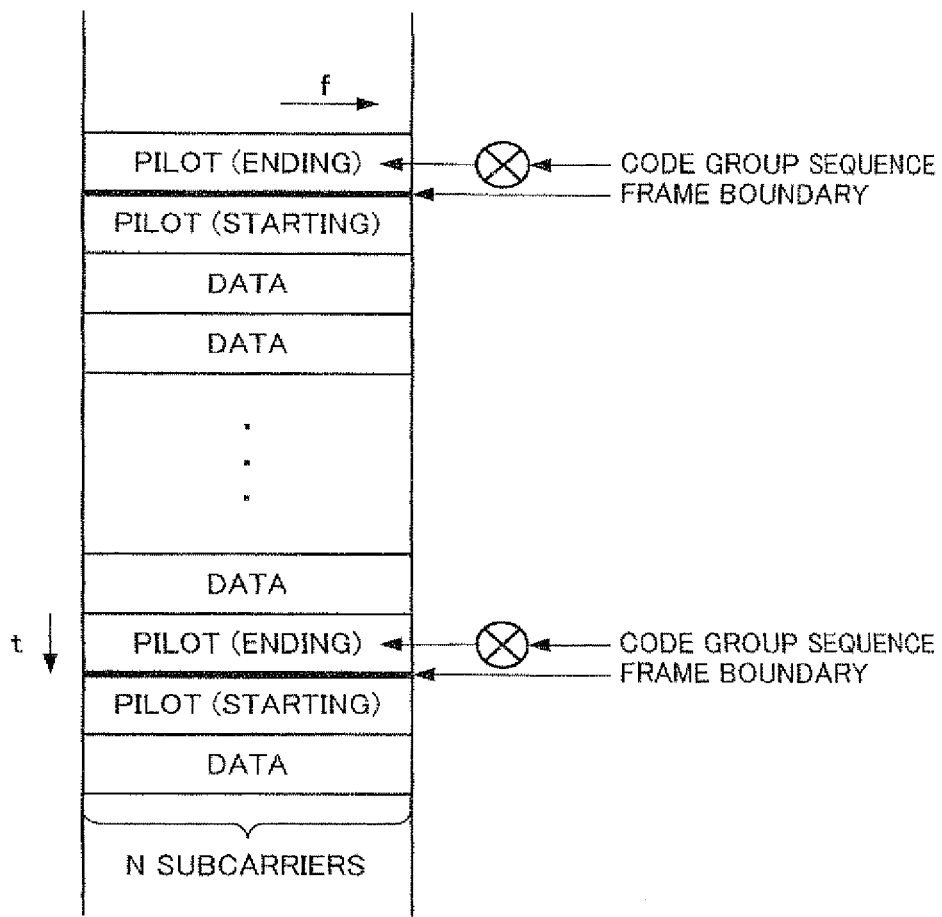
FIG. 5 is a drawing explaining a frame configuration of Embodiment 1.

Frame configuration section 130 has a modulated signal as input from modulation section 110, and also has a pilot signal and a pilot signal multiplied by code group sequences as input from code group sequence multiplication section 125. Then frame configuration section 130 forms a frame having a configuration in which a pilot signal is arranged at the start, and a pilot signal multiplied by code group sequences at the end, and a modulated signal (data) is arranged in the remainder (see FIG. 5). Frame configuration section 130 then outputs an OFDM symbol with an OFDM symbol that is subcarrier number N symbols as a unit.

Scrambling code generation section 135 generates a scrambling code according to the scrambling code number unique to base station apparatus 100. Then scrambling code generation section 135 outputs the scrambling code number to code group sequence generation section 120, and also outputs the generated scrambling code to scrambling section 140.

Scrambling section 140 has a scrambling code as input from scrambling code generation section 135 and also has transmit data as input from frame configuration section 130 in OFDM symbol units, and performs scrambling by multiplying each OFDM symbol by the scrambling code. The scrambled transmission data is output to IFFT section 145.

IFFT section 145 has the scrambled transmission data as input from scrambling section 140, generates a multicarrier signal by converting the frequency-domain signal to a time-domain signal, and outputs the multicarrier signal to GI (Guard Interval) insertion section 150.

GI insertion section 150 inserts a guard interval for each OFDM symbol, and outputs a signal to which the guard interval is inserted, to radio transmission section 155.

Radio transmission section 155 has the signal to which the guard interval is inserted, as input from GI insertion section 150, performs RF processing such as up-conversion, and transmits the resulting signal via an antenna.

Radio reception section 160 receives a signal from a mobile station apparatus via the antenna, performs RF processing such as down-conversion, and outputs a signal that has undergone RF processing to GI removal section 165.

GI removal section 165 has the signal that has undergone RF processing as input from radio reception section 160, removes the guard interval, and outputs the resulting signal to FFT section 170.

FFT section 170 has the received OFDM signal that has undergone guard interval removal as input from radio reception section 160, converts the time-domain signal to a frequency-domain signal, and extracts subcarrier signals from the multicarrier signal. Then a signal that has undergone FFT processing is output to demodulation section 175.

Demodulation section 175 has the signal that has undergone FFT processing as input from FFT section 170, and performs demodulation on a subcarrier-by-subcarrier basis. After subcarrier demodulation, the signal is output to decoding section 180.

Decoding section 180 has the demodulated signal as input from demodulation section 175, performs appropriate error correction decoding, and extracts a received signal.

Figure 6:
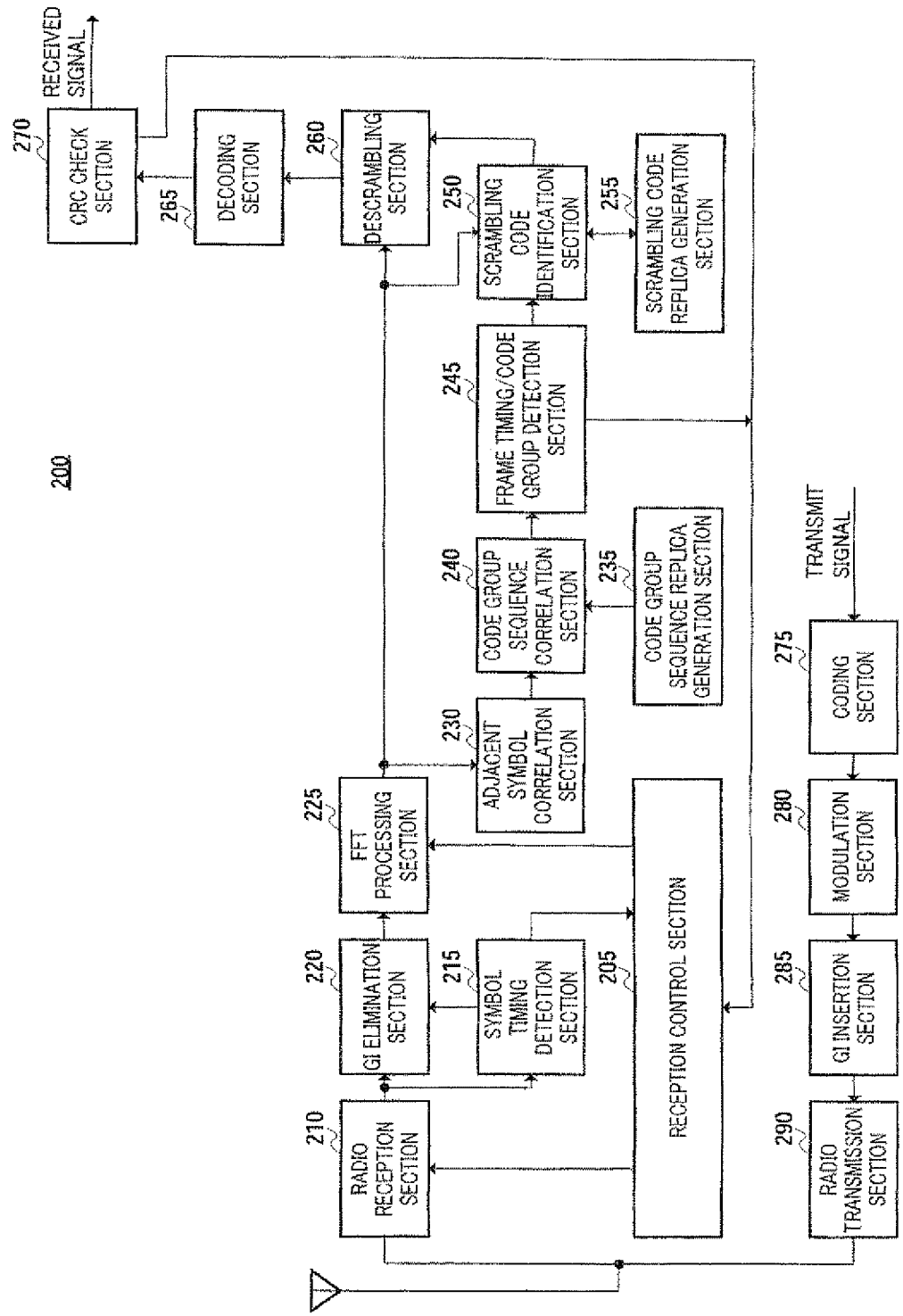
FIG. 6 is a block diagram showing the configuration of a mobile station apparatus according to Embodiment 1.

As shown in FIG. 6, a mobile station apparatus 200 of Embodiment 1 has a reception control section 205, a radio reception section 210, a symbol timing detection section 215, a GI removal section 220, an FFT processing section 225, an adjacent symbol correlation section 230, a code group sequence replica generation section 235, a code group sequence correlation section 240, a frame timing/code group detection section 245, a scrambling code identification section 250, a scrambling code replica generation section 255, a descrambling section 260, a decoding section 265, a CRC check section 270, a coding section 275, a modulation section 280, a GI insertion section 285, and a radio transmission section 290.

Reception control section 205 performs control relating to the output destination of an output signal from radio reception section 210 according to the state of mobile station apparatus 200—that is, according to which step of the initial cell search mode is in effect, or whether normal receive mode is in effect—or the success or failure of code identification. Specifically, reception control section 205 controls the output destination of an output signal from radio reception section 210 by outputting an output destination directive signal to radio reception section 210. This output destination directive signal indicates that symbol timing detection section 215 is the output destination when the state of mobile station apparatus 200 is the first step of the initial cell search mode, or indicates that GI removal section 220 is the output destination when the state of mobile station apparatus 200 is other than the first step.

Radio reception section 210 receives a signal from base station apparatus 100 via an antenna, and performs RF processing such as down-conversion. Then radio reception section 210 outputs a signal that has undergone RF processing to the output destination indicated by the above-described output destination directive signal from reception control section 205.

Symbol timing detection section 215 has as input a signal that has undergone RF processing from radio reception section 210 when the mobile station apparatus is in the initial cell search mode. Symbol timing detection section 215 calculates guard interval correlation and detects OFDM symbol timing using the correlation characteristic of guard intervals in OFDM symbols. That is to say, this OFDM symbol timing is FFT window timing for implementing FFT. While guard interval correlation is executed in symbol units, the accuracy of symbol timing detection can be increased by averaging correlation values over one frame. Then symbol timing detection section 215 outputs the detected symbol timing result to GI removal section 220, and also outputs to reception control section 205 a first step end report signal reporting that symbol timing has been detected—that is, the first step of the cell search has ended.

GI removal section 220 removes guard intervals from a received signal that has undergone RF processing in accordance with the OFDM symbol timing from symbol timing detection section 215, and outputs the signal to FFT processing section 225.

FFT processing section 225 has a received signal that has undergone guard interval removal from GI removal section 220 as input in OFDM symbol units, and executes FFT processing on this input signal. Then FFT processing section 225 outputs a signal that has undergone FFT processing to an output destination in accordance with the output destination directive signal from reception control section 205. Specifically, when the current state of mobile station apparatus 200 is the second step of a cell search, FFT processing section 225 has as input an output destination directive signal indicating that adjacent symbol correlation section 230 is the output destination, and outputs a signal that has undergone FFT processing to adjacent symbol correlation section 230. On the other hand, when the current state of mobile station apparatus 200 is the third step of a cell search, FFT processing section 225 has as input an output destination directive signal indicating that scrambling code identification section 250 is the output destination, and outputs an OFDM symbol containing a pilot signal that has undergone FFT processing and that is arranged at the start of a frame to scrambling code identification section 250. Only a scrambling code is multiplied by this OFDM symbol containing a pilot signal arranged at the start of a frame, and any code group sequences is not multiplied. Alternatively, when an output destination directive signal other than an output destination directive signal indicating that adjacent symbol correlation section 230 is the output destination or an output destination directive signal indicating that scrambling code identification section 250 is the output destination is input from reception control section 205, FFT processing section 225 outputs a signal that has undergone FFT processing to descrambling section 260.

Figure 7:
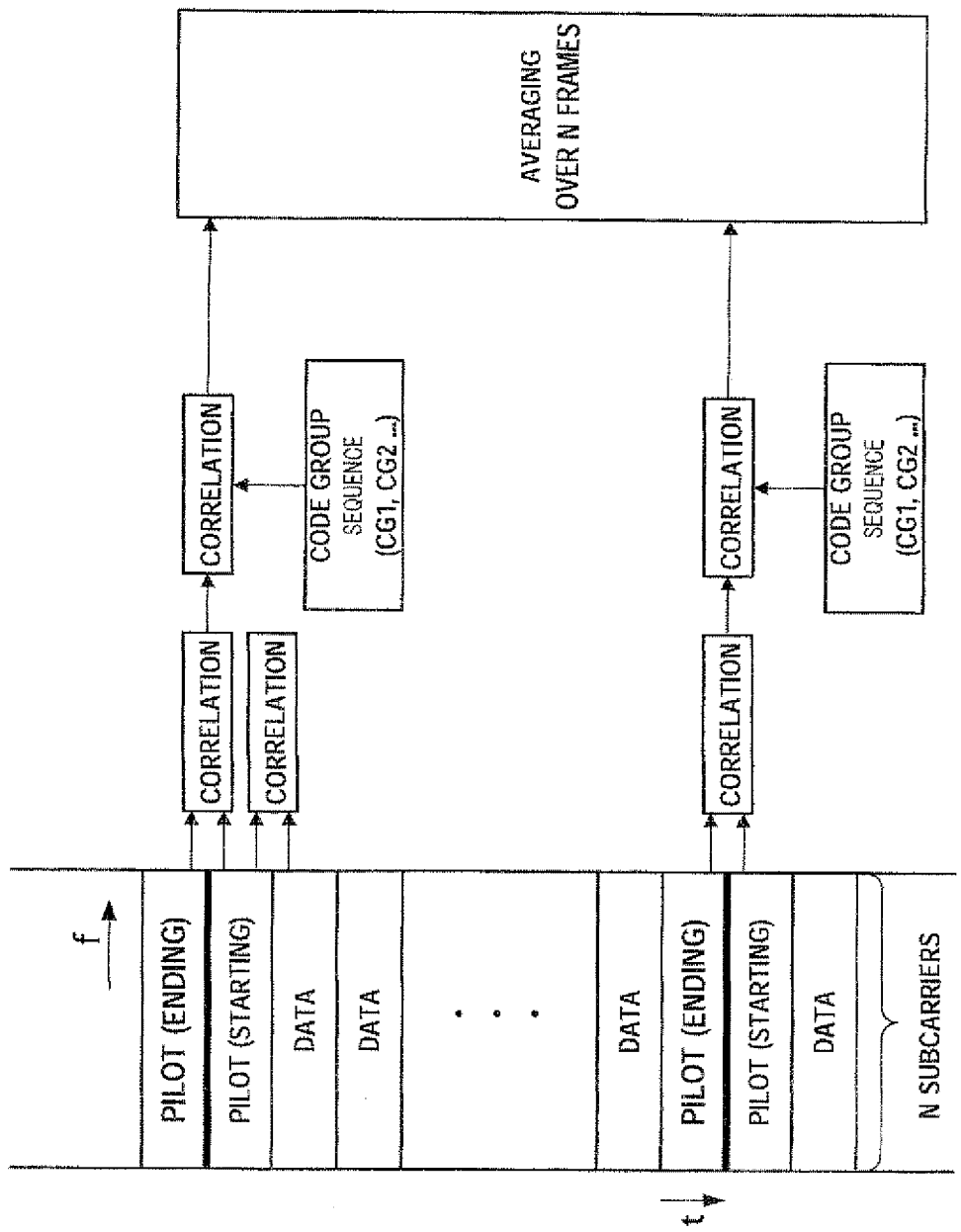
FIG. 7 is a drawing explaining the operation of the adjacent symbol correlation section and code group sequence correlation section in FIG. 6.

Adjacent symbol correlation section 230 has a signal that has undergone FFT processing as input from FFT processing section 225, and calculates a correlation sequence with correlation calculated between two temporally consecutive OFDM symbols (see FIG. 7). This correlation sequence calculation is performed over n frames in order to subsequently average correlation values between correlation sequence and code group sequence replica. A calculated correlation sequence is then output to code group sequence correlation section 240.

Code group sequence replica generation section 235 generates all the code group sequences calculated beforehand in the system, and outputs these to code group sequence correlation section 240.

As shown in FIG. 7, code group sequence correlation section 240 has a correlation sequence calculated by adjacent symbol correlation section 230 and code group sequences from code group sequence replica generation section 235 as input, and calculates correlations between the correlation sequence and all the code group sequences. This correlation computation is performed for n frames, and an average is calculated for n correlation values calculated from a correlation sequence and code group sequences calculated from OFDM symbols having the same temporal position in the frames. Then code group sequence correlation section 240 outputs all the averaged correlation values to frame timing/code group detection section 245.

Frame timing/code group detection section 245 has averaged correlation values as input from code group sequence correlation section 240, and detects the maximum correlation value giving the largest value among these. Then frame timing/code group detection section 245 stores the timing in the frame at which the maximum correlation value is calculated and the code group sequence used in multiplication when that maximum correlation value is calculated.

Then frame timing/code group detection section 245 calculates a threshold value used to detect other code group sequences of a code group sequence set by means of a predetermined method from the value of the maximum correlation value. Specifically, for example, a value calculated by subtracting a predetermined value X [dB] from the value of the maximum correlation value is used as the above-mentioned threshold value. Then, using the calculated threshold value, frame timing/code group detection section 245 detects the largest correlation value from among correlation values exceeding this threshold value among the remaining correlation values. Then the timing in the frame corresponding to the correlation value—excluding the above-mentioned stored maximum correlation value—having the largest value and having a value exceeding the threshold value, and the code group sequence used in multiplication when this correlation value is calculated, are stored. If there is no correlation value exceeding the threshold value other than the maximum correlation value, the code group sequence set multiplied in base station apparatus 100 that transmits a frame includes code group sequence of one type. In this case, frame timing/code group detection section 245 outputs the timing in the frame at which the previously stored maximum correlation value is calculated to reception control section 205, and outputs the code group sequences corresponding to the maximum correlation value to scrambling code identification section 250.

If there is a correlation value exceeding the threshold value other than the maximum correlation value, frame timing/code group detection section 245 determines whether or not the timing in the frame corresponding to the correlation value—excluding the above-mentioned stored maximum correlation value—having the largest value and having a value exceeding the threshold value, and the timing in the frame at which the maximum correlation value is calculated, coincide. That is to say, frame timing/code group detection section 245 determines whether or not timings corresponding to two large correlation values coincide. In this embodiment, a code group sequence set is assumed to be composed of two code group sequences, and therefore timing in a frame and code group sequences corresponding to these correlation values are detected as described above for two large correlation values. However, the number of code group sequences composing a code group sequence set is not limited to two, and may be greater than two. In this case, the number of correlation values detected should be increased according to the number of code group sequences.

If the result of the determination is that the timings corresponding to the above two correlation values do not coincide, frame timing/code group detection section 245 determines that the second step of the cell search has failed, and outputs a second step failure indicator that the second step has failed to reception control section 205. The reason for determining that the second step of the cell search has failed if the timings corresponding to the above two correlation values do not coincide is that, since a pilot signal arranged in a frame-end OFDM symbol is multiplied by a code group-sequence set in base station apparatus 100, it is necessary for the timings corresponding to the above two correlation values to coincide in order for the successful second step of the cell search.

On the other hand, if the result of the determination is that the timings corresponding to the above two correlation values coincide, frame timing/code group detection section 245 determines that second-step frame timing detection has succeeded, outputs the detected frame timing to reception control section 205, and also outputs code group sequence identification information (for example, a code group sequences number) identifying the code group sequences corresponding to the detected two correlation values to scrambling code identification section 250. In this embodiment, scrambling code candidates have already been narrowed down to two in the step leading to the third step, and the amount of processing is reduced compared with a conventional cell search method in which scrambling codes are only narrowed down to 16 corresponding to scrambling codes identified in the second step in the step leading to the third step.

Scrambling code identification section 250 identifies a scrambling code corresponding to the code group sequence identification information from frame timing/code group detection section 245.

Specifically, if code group sequence identification information from frame timing/code group detection section 245 is of only one type, a scrambling code corresponding to this code group sequences identification information can be uniquely identified, and therefore identification information for the identified scrambling code is output to scrambling code replica generation section 255, and a scrambling code replica generated accordingly is output to descrambling section 260.

On the other hand, if code group sequence identification information from frame timing/code group detection section 245 is of two types, there are two scrambling code candidates identified from a combination of these code group sequences. Thus, identification information for these two scrambling code candidates is output to scrambling code replica generation section 255, and scrambling code replicas generated accordingly are received. Then scrambling code identification section 250 calculates correlations by multiplying the respective scrambling code replicas received from scrambling code replica generation section 255 by an OFDM symbol containing a pilot signal located at the start of a frame received from FFT processing section 225. Then the scrambling code replica for which the largest value is calculated among the calculated correlation values is identified as the scrambling code, and the identified scrambling code is output to descrambling section 260.

There are various methods of performing scrambling code identification in scrambling code identification section 250. For example, it is also possible to receive OFDM symbols containing a pilot signal located at the start of a frame, over n frames from FFT processing section 225, calculate correlations by multiplying these n pilot signals by a scrambling code replica received from scrambling code replica generation section 255, perform averaging for each correlation result, and identify the scrambling code replica for which the largest averaged correlation value is calculated as the scrambling code.

Scrambling code replica generation section 255 generates scrambling codes corresponding to scrambling code identification information from scrambling code identification section 250, and outputs them to scrambling code identification section 250 as a scrambling code replicas.

Descrambling section 260 has a signal that has undergone FFT processing from FFT processing section 225 as input, performs descrambling by multiplying this signal by the scrambling code received from scrambling code identification section 250, and outputs the descrambled signal to decoding section 265.

Decoding section 265 has the descrambled signal as input, performs appropriate error correction decoding, and outputs the error correction decoding result to CRC check section 270.

CRC check section 270 performs a CRC error check on the error correction decoding result from decoding section 265, and if there is no error, determines that the initial cell search has been completed. On the other hand, if there is an error, CRC check section 270 outputs the CRC error check result to reception control section 205, which should redo the initial cell search from the first step. On receiving this CRC error check result output when an error is present, reception control section 205 outputs an output destination directive signal to radio reception section 210 indicating that symbol timing detection section 215 is the output destination.

Coding section 275 has a transmit signal such as a DCH as input, executes predetermined coding, and outputs a coded signal to modulation section 280.

Modulation section 280 has the coded signal as input, performs modulation according to the transmission signal QoS or radio channel state, and outputs a modulated signal to radio transmission section 290.

Radio transmission section 290 has the modulated signal as input, performs RF processing such as up-conversion, and transmits the resulting signal via the antenna.

Figure 8:
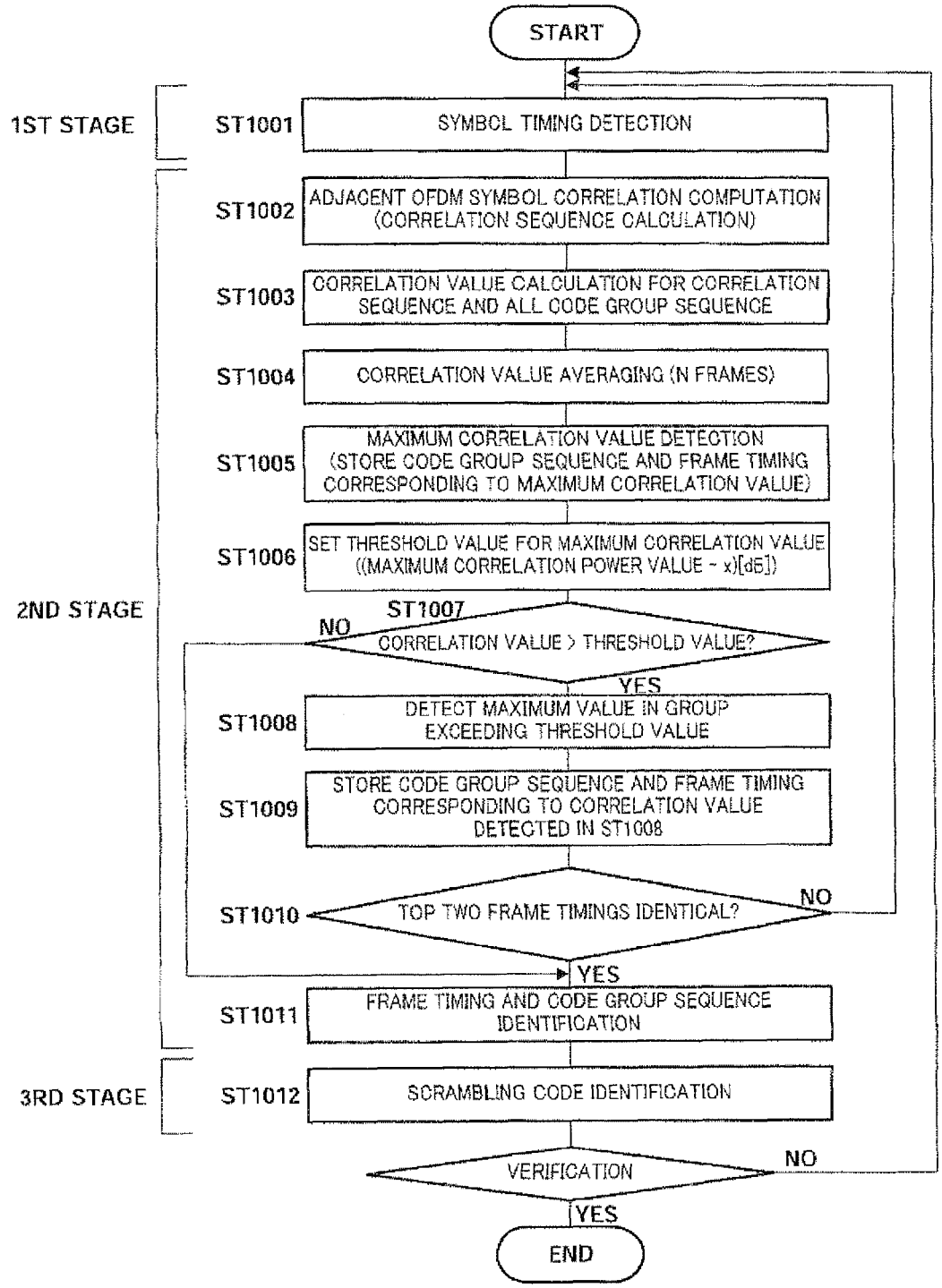
FIG. 8 is a flowchart explaining the operation of the mobile station apparatus in FIG. 6.

The operation of mobile station apparatus 200 having the above-described configuration will now be explained with reference to FIG. 8.

In step ST1001, symbol timing detection section 215 of mobile station apparatus 200 calculates the guard interval correlation, and detects the OFDM symbol timing using the correlation characteristics of OFDM guard interval in individual OFDM symbol. This is the first step of the initial cell search.

In step ST1002 of the second step of the initial cell search, adjacent symbol correlation section 230 has a signal that has undergone FFT processing as input from FFT processing section 225, and calculates a correlation sequence with correlation calculated between two temporally consecutive OFDM symbols. Correlation sequence calculation is performed at all symbol timings in a frame.

In step ST1003, code group sequence correlation section 240 has a correlation sequence calculated by adjacent symbol correlation section 230 and code group sequences from code group sequence replica generation section 235 as input, and calculates correlations between the correlation sequence and all the code group sequences. This correlation computation is performed for all symbol timings of n frames.

In step ST1004, code group sequence correlation section 240 performs averaging for n correlation values calculated between a correlation sequence calculated from OFDM symbols at the same temporal position in a frame and all code group sequences. That is to say, averaging is performed in frame units, and therefore an averaged correlation value for the number of OFDM symbols in one frame is calculated.

In step ST1005, frame timing/code group detection section 245 has averaged correlation values as input from code group sequence correlation section 240, and detects the maximum correlation value among them. Then frame timing/code group detection section 245 stores the symbol timing at which the maximum correlation value is calculated and the code group sequence used in multiplication when that maximum correlation value is calculated.

The reason for storing the symbol timing at which the maximum correlation value is calculated and the code group sequence used in multiplication when that maximum correlation value is calculated is that this symbol timing position is a frame timing candidate, and this code group sequence is a key for identifying the scrambling code group. As there is no correlation between a pilot signal and transmit data, the correlation value between an OFDM symbol containing a pilot signal and an OFDM symbol containing transmit data is a small value. On the other hand, when the correlation is calculated between OFDM symbols containing ending and starting pilot symbols, and when the correlation is calculated between a code group sequence multiplied by an ending pilot signal and that code group sequence, a large peak appears.

Therefore, OFDM symbol timing at which the correlation value between adjacent OFDM symbol correlation and a code group sequence is greatest has a high possibility of being frame timing. Also, a code group sequence giving the maximum correlation value has a high possibility of being a code group sequence multiplied by a pilot signal arranged at the end of a frame in base station apparatus 100 to be accessed.

In step ST1006, frame timing/code group detection section 245 calculates and sets a threshold value used to detect another code group sequence of a code group sequence set by means of a predetermined method from the value of the maximum correlation value. Specifically, for example, a value calculated by subtracting a predetermined value X [dB] from the maximum correlation value is used as the above-mentioned threshold value.

In step ST1007, frame timing/code group detection section 245 compares the threshold value calculated in step ST1006 with above-described averaged correlation values other than the above-described maximum correlation value.

If the result of this comparison is that there is a correlation value exceeding the threshold value other than the maximum correlation value (step ST1007: YES), that correlation value is detected (step ST1008).

In step ST1009, frame timing/code group detection section 245 stores the symbol timing of the correlation value detected in step ST1008, and the code group sequence used when calculating that correlation value.

In step ST1010, frame timing/code group detection section 245 compares the symbol timings (in other words, the symbol positions in a virtual frame) corresponding to the top two correlation values (the two correlation values in high-to-low value order) stored in step ST1005 and step ST1009.

If the result of the comparison is that the two timings are not the same—that is, do not coincide—(step ST1010: NO), frame timing/code group detection section 245 determines that initial cell search second-step frame timing identification has failed, and returns to step ST1001 by outputting a second step failure indicator that the second step has failed to reception control section 205.

On the other hand, if the result of the comparison is that the two timings coincide (step ST1010: YES), frame timing/code group detection section 245 determines that second-step frame timing detection has succeeded, and the relevant frame timing and code group sequences are deemed to have been identified (step ST1011). Then frame timing/code group detection section 245 outputs code group sequence identification information identifying the identified code group sequences to scrambling code identification section 250.

Thus, the success or failure of frame timing identification can be determined based on a comparison of the symbol positions of two correlation values, and if frame timing is determined to have failed, subsequent calculation processing can be abandoned at that point, and initial cell search. processing can be retried from the first step. As a result, a cell search can be redone without delay in the event of a failure, enabling fast cell search.

Also, if the result of the comparison is that there is no correlation value exceeding the threshold value other than the maximum correlation value (step ST1007: NO), the processing flow proceeds to step ST1011, and frame timing/code group detection section 245 identifies the items stored in step ST1005 as the frame timing and code group sequence. Then frame timing/code group detection section 245 outputs code group sequence identification information identifying the identified code group sequence to scrambling code identification section 250.

Next, the processing flow proceeds to the third step of the initial cell search, and in step ST1012 scrambling code candidates corresponding to the code group sequence identification information from frame timing/code group detection section 245 are identified. Replicas of these candidate scrambling codes are generated sequentially, the correlation between a pilot signal and scrambling code replicas in a received signal of OFDM symbols in which a CPICH is multiplexed is calculated and a maximum correlation value is detected, and the scrambling code for which the maximum correlation value is calculated is identified.

Lastly, verification is performed as to whether the identified scrambling code is correct, and if it is incorrect, the processing flow returns to step ST1001. The above-described CRC error check or the like, for example, can be used for this error verification.

In the above description, it is assumed that a transmitted/received frame is configured with a pilot signal arranged at the start and a pilot signal multiplied by code group sequences arranged at the end, and a modulated signal (data) arranged in the rest of the frame, but frame structure is not limited to this configuration, and a configuration may also be used in which, conversely, a pilot signal multiplied by code group sequences is arranged at the start and a pilot signal is arranged at the end. Also, a pilot signal may occupy only one OFDM symbol in a frame, in which case a pilot symbol may be multiplexed in half of the subcarriers within that one OFDM symbol, and a symbol in which a pilot and code sequences are multiplied may be multiplexed in the other half of the subcarriers. It is only necessary to detect frame timing by arranging both pilot signals on either side of a frame boundary or by arranging a pilot symbol before or after the frame boundary.

Thus, according to Embodiment 1, a base station apparatus 100 is equipped with: a frame configuration section 130 that forms a frame by arranging a pilot symbol multiplied by a plurality of (code group) sequences contained in a (code group) sequence set corresponding to a code group to which a base station scrambling code assigned to that apparatus belongs at at least the start or end; and a radio transmission section 155 that transmits the formed frame.

By this means, a mobile station that receives an above-described frame can detect frame timing from the position of a pilot symbol contained in that frame, and furthermore candidates are narrowed down to sequences sets of the number of combinations of sequences contained in a sequence set at the most by detecting a sequence set multiplied by a pilot symbol due to the fact that a base station scrambling code and a (code group) sequence set containing a plurality of (code group) sequences are mutually associated, with the result that third-step scrambling code identification processing is alleviated, cell search processing can be alleviated, and a base station scrambling code corresponding to such sequence set candidates can be fast identified.

Also, according to Embodiment 1, a mobile station apparatus 200 is equipped with: a radio reception section 210 that receives a frame in which a pilot symbol multiplied by one or a plurality of (code group) sequences contained in a (code group) sequence set corresponding to a code group to which a base station scrambling code belongs is arranged at at least the start or end; a correspondence table in which the base station scrambling code and the sequence set are mutually associated; a code group sequence correlation section 240 (adjacent symbol correlation section 230) serving as a correlation section that multiplies all (code group) sequence candidates by the frame and calculates correlations; a frame timing/code group detection section 245 that detects frame timing and one or a plurality of (code group) sequences multiplied by the pilot symbol based on correlation values calculated by the correlation section; and a scrambling code identification section 250 that identifies scrambling code candidates corresponding to the sequence set containing the detected (code group) sequences, and detects the base station scrambling code from among the scrambling code candidates.

By this means, frame timing can be detected from the position of a pilot symbol contained in a received frame, and furthermore candidates are narrowed down to spreading code sets of the number of combinations of spreading codes contained in a spreading code set at the most by detecting a code group sequence set multiplied by a pilot symbol due to the fact that a base station scrambling code and a sequence set containing one or a plurality of (code group) sequences are mutually associated, with the result that cell search processing can be alleviated, and a base station scrambling code corresponding to such a spreading code set candidate can be fast identified.

Adjacent symbol correlation section 230 and code group sequence correlation section 240 serving as the above-described correlation section calculate correlations by sequentially multiplying all the (code group) sequence candidates by a correlation sequence between temporally adjacent symbols in a received frame, and frame timing/code group detection section 245 identifies only a number equal to the number of (code group) sequences contained in the (code group) sequence set in high-to-low value order from correlation values calculated by the correlation section, and detects symbol timing in the (virtual) frame at which that identified correlation value is calculated and the (code group) sequences used in multiplication when that identified correlation value is calculated as the frame timing and the (code group) sequences multiplied by the pilot symbol.

By thus calculating correlations by sequentially multiplying all the (code group) sequence candidates by a correlation sequence between temporally adjacent symbols in a received frame, and detecting frame timing and a sequence using this correlation value, the effect of phase noise added to a received frame in the propagation path or the like can be alleviated, and frame timing and a sequence can be detected more accurately.

(Embodiment 2)

In Embodiment 1, correlation values calculated by calculating correlations for a correlation sequence of adjacent OFDM symbols for each code group sequence are averaged for each code group sequence over n frames, after which the top one or two correlation values are detected by means of a threshold value comparison, and the code group sequences used by a base station is identified by detecting the code group sequences used in multiplication when the detected correlation value(s) is/are calculated. In contrast, in Embodiment 2, correlation values calculated by calculating correlations for a correlation sequence of adjacent OFDM symbols for each code group sequence are added for each code group sequence set, the sum of correlation values are averaged over n/2 frames, and then the code group sequence set by which multiplication is performed in order to calculate the largest correlation value among these averaged correlation values is identified. By this means, the scope of averaging processing is halved compared with the averaging processing performed over n frames in Embodiment 1, making a faster initial cell search possible. Also, the SN ratio of OFDM received symbols can be increased by performing adding processing, enabling values with the same high degree of reliability as in Embodiment 1 to be calculated even though the number of frames for which averaging processing is performed is halved, and making it possible to implement a highly reliable fast initial cell search.

Figure 9:
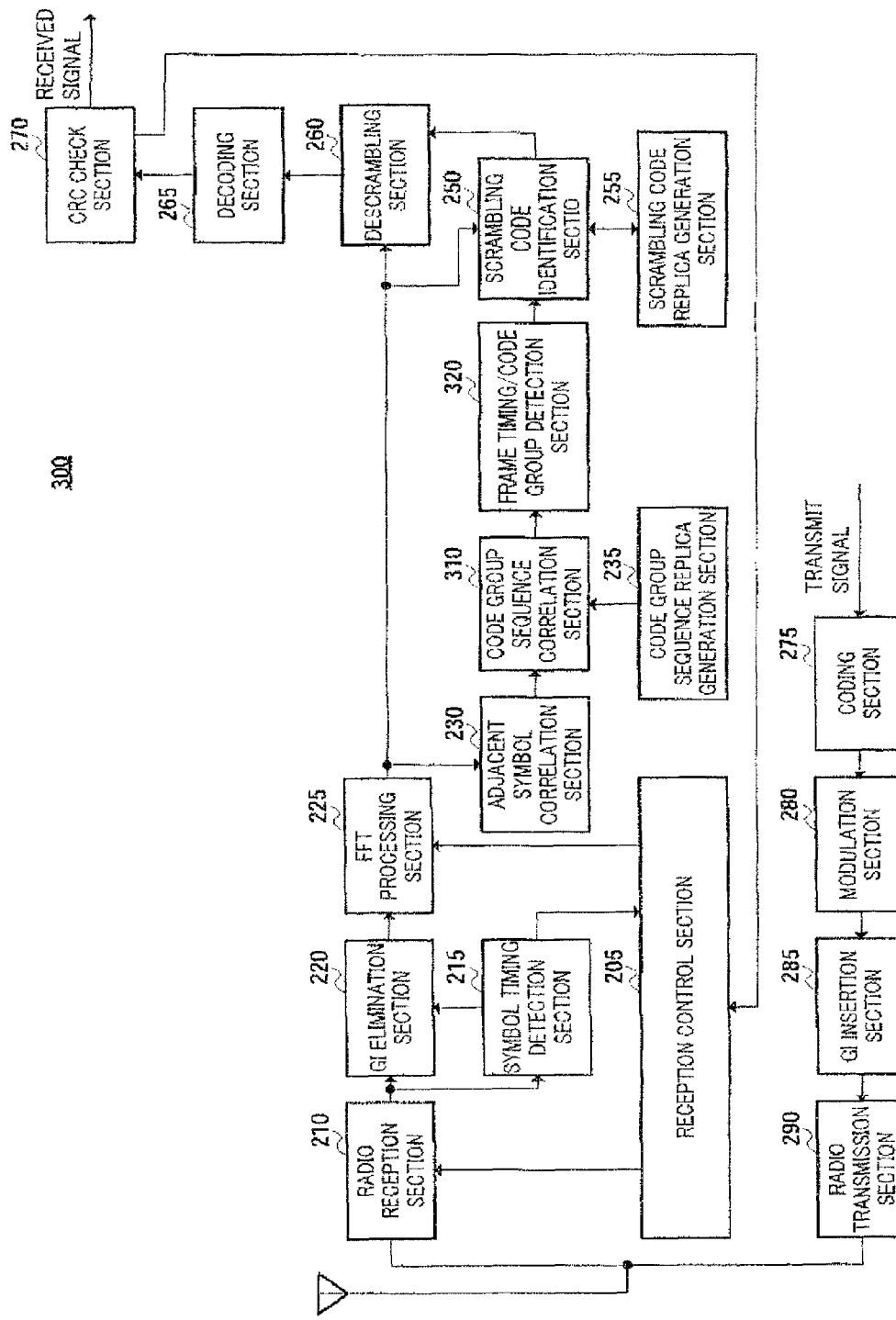
FIG. 9 is a block diagram showing the configuration of a mobile station apparatus according to Embodiment 2.

As shown in FIG. 9, a mobile station apparatus 300 of Embodiment 2 has a code group sequence correlation section 310 and a frame timing/code group detection section 320.

Code group sequence correlation section 310 has a correlation sequence calculated by adjacent symbol correlation section 230 and code group sequences from code group sequence replica generation section 235 as input, and calculates correlations between the correlation sequence and all the code group sequences. Then code group sequence correlation section 310 adds correlation values calculated by the above correlation calculation according to combinations corresponding to code group sequence sets. Code group sequence correlation section 310 then averages the sum of correlation values calculated by this addition for each code group sequence set over n/2 frames. Then code group sequence correlation section 310 outputs all the averaged sum of correlation values to frame timing/code group detection section 320.

Frame timing/code group detection section 320 has averaged sum of correlation values as input from code group sequence correlation section 310, and detects the maximum sum of correlation values giving the largest value among these. Then frame timing/code group detection section 320 identifies the symbol timing (position) at which the maximum sum of correlation values is calculated and the code group sequence set used in multiplication when the maximum sum of correlation values is calculated.

Frame timing/code group detection section 320 then outputs information identifying the identified code group sequence set to scrambling code identification section 250. The information identifying the code group sequence set may be, for example, code group sequence identification information identifying code group sequences composing the code group sequence set, or a scrambling code number corresponding to the code group sequence set.

Figure 10:
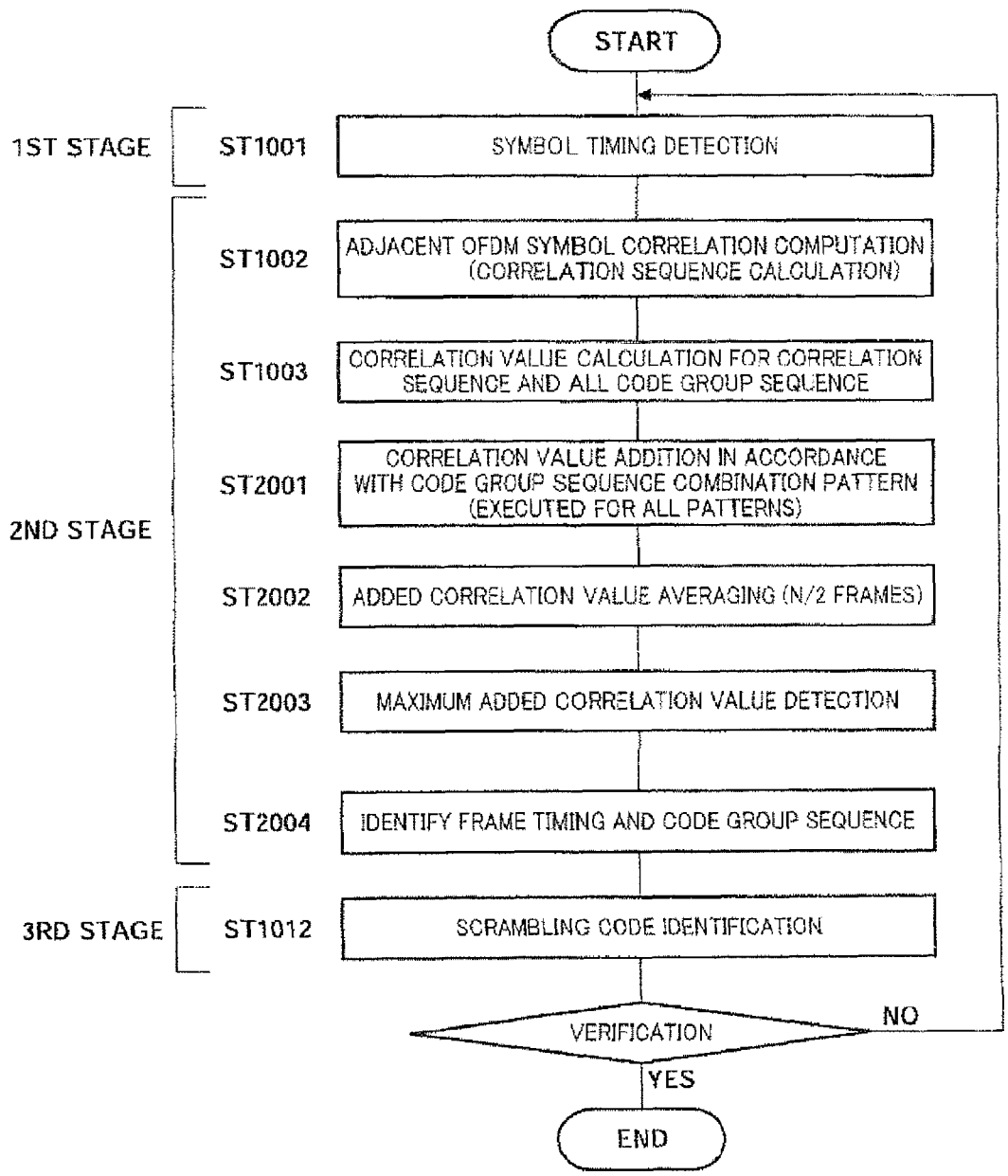
FIG. 10 is a flowchart explaining the operation of the mobile station apparatus in FIG. 9.

The operation of mobile station apparatus 300 having the above-described configuration will now be explained with reference to FIG. 10.

In step ST1003, code group sequence correlation section 310 has a correlation sequence calculated by adjacent symbol correlation section 230 and code group sequences from code group sequence replica generation section 235 as input, and calculates correlations between the correlation sequence and all the code group sequences.

In step ST2001, code group sequence correlation section 310 adds correlation values calculated by the above correlation calculation by means of combinations corresponding to code group sequence set on a symbol-by-symbol basis.

In step ST2002, code group sequence correlation section 310 averages the sum of correlation values calculated by this addition over n/2 frames on a symbol-by-symbol basis. Then code group sequence correlation section 310 outputs all the averaged sum of correlation values to frame timing/code group detection section 320.

In step ST2003, frame timing/code group detection section 320 has averaged sum of correlation values as input from code group sequence correlation section 310, and detects the maximum sum of correlation values giving the largest value among them.

In step ST2004, frame timing/code group detection section 320 identifies the symbol timing at which the maximum sum of correlation values is calculated and the code group sequence set used in multiplication when the maximum sum of correlation values is calculated.

Frame timing/code group detection section 320 then outputs information identifying the identified code group sequences set to scrambling code identification section 250.

Thus, according to Embodiment 2, a mobile station apparatus 300 is equipped with: a radio reception section 210 that receives a frame in which a pilot symbol multiplied by a plurality of (code group) sequences contained in a (code group) sequence set corresponding to a base station scrambling code is arranged at at least the start or end; a correspondence table in which the base station scrambling code and the (code group) sequence set are mutually associated (see FIG. 4); an adjacent symbol correlation section 230 and code group sequence correlation section 310 that calculate correlation values by successively multiplying all the (code group) sequence candidates by a correlation sequence between temporally adjacent symbols in the frame; a frame timing/code group detection section 320 that detects frame timing and (code group) sequences multiplied by the pilot symbol based on the correlation values; and a scrambling code identification section 250 that determines scrambling code candidates corresponding to the (code group) sequence set containing the detected (code group) sequences from the correspondence table, and detects the base station scrambling code from among the scrambling code candidates.

By this means, the SN ratio of a received symbol can be increased by performing correlation value adding processing within one symbol, enabling highly reliable values to be calculated even though the number of averaged frames is halved when averaging processing is performed over a plurality of frames, and making it possible to implement fast cell search.

(Embodiment 3)

In Embodiment 1, code group sequence multiplication of all code group sequences composing a code group sequence set is performed for all subcarriers in a frame-end OFDM symbol in base station apparatus 100. In contrast, in Embodiment 3, subcarriers in a frame-end OFDM symbol are divided into a plurality of subcarrier blocks in a base station apparatus, and multiplication is performed for a plurality of code group sequences corresponding to a code group sequence set for each of these subcarrier blocks.

Figure 11:
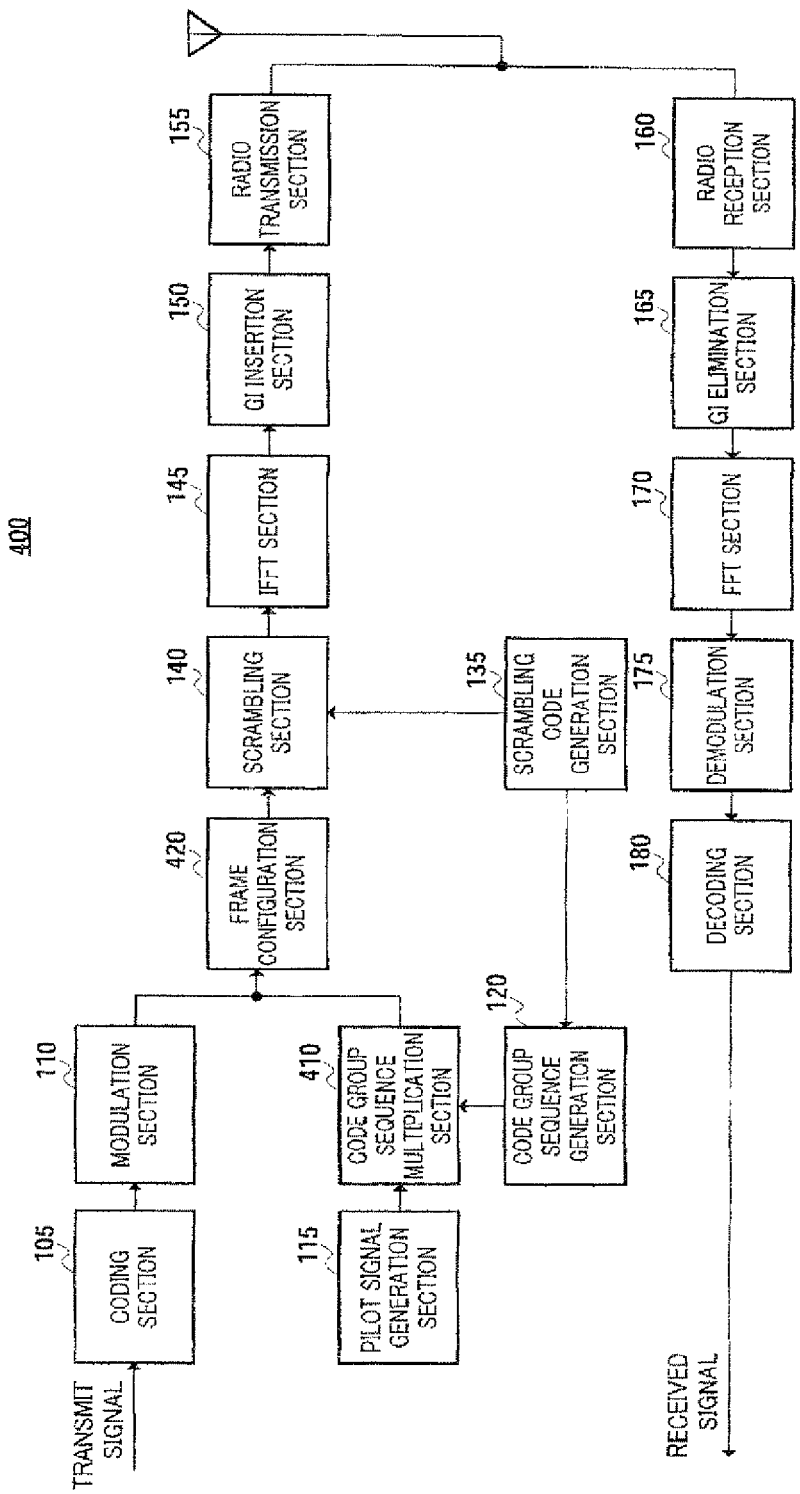
FIG. 11 is a block diagram showing the configuration of a base station apparatus according to Embodiment 3.

As shown in FIG. 11, a base station apparatus 400 of Embodiment 3 has a code group sequence multiplication section 410 and a frame configuration section 420.

Code group sequence multiplication section 410 has a code group sequence set from code group sequences generation section 120 as input. Then code group sequence multiplication section 410 multiplies the pilot signal from pilot signal generation section 115 by the code group sequences composing the code group sequence set, as a result of which a pilot signal multiplied by each code group sequence is generated. Code group sequence multiplication section 410 then outputs a plurality of sequences including the pilot signal itself and a sequence in which the pilot signal has been multiplied by each code group sequence to frame configuration section 420.

Frame configuration section 420 has a modulated signal as input from modulation section 110, and also has a pilot signal and a pilot signal multiplied by code group sequences as input from code group sequence multiplication section 410. Then frame configuration section 420 forms a frame having a configuration in which a pilot signal is arranged at the start, and a pilot signal multiplied by code group sequences at the end, and a modulated signal (data) is arranged in the remainder (see FIG. 12). Furthermore, in a frame formed by this frame configuration section 420, subcarriers in an OFDM symbol in which the end pilot signal is arranged are divided into several subcarrier blocks, and code group sequences including a code group sequence set are multiplied on a subcarrier-block by subcarrier-block basis. Specifically, in FIG. 12, subcarriers are divided into two subcarrier blocks comprising a low-frequency-side subcarrier block 1 and a high-frequency-side subcarrier block 2, and, for example, code group sequence CG1 that is a component of the code group sequence set corresponding to scrambling code number C2 is multiplied by subcarrier block 1, and CG2 is multiplied by subcarrier block 2.

Figure 12:
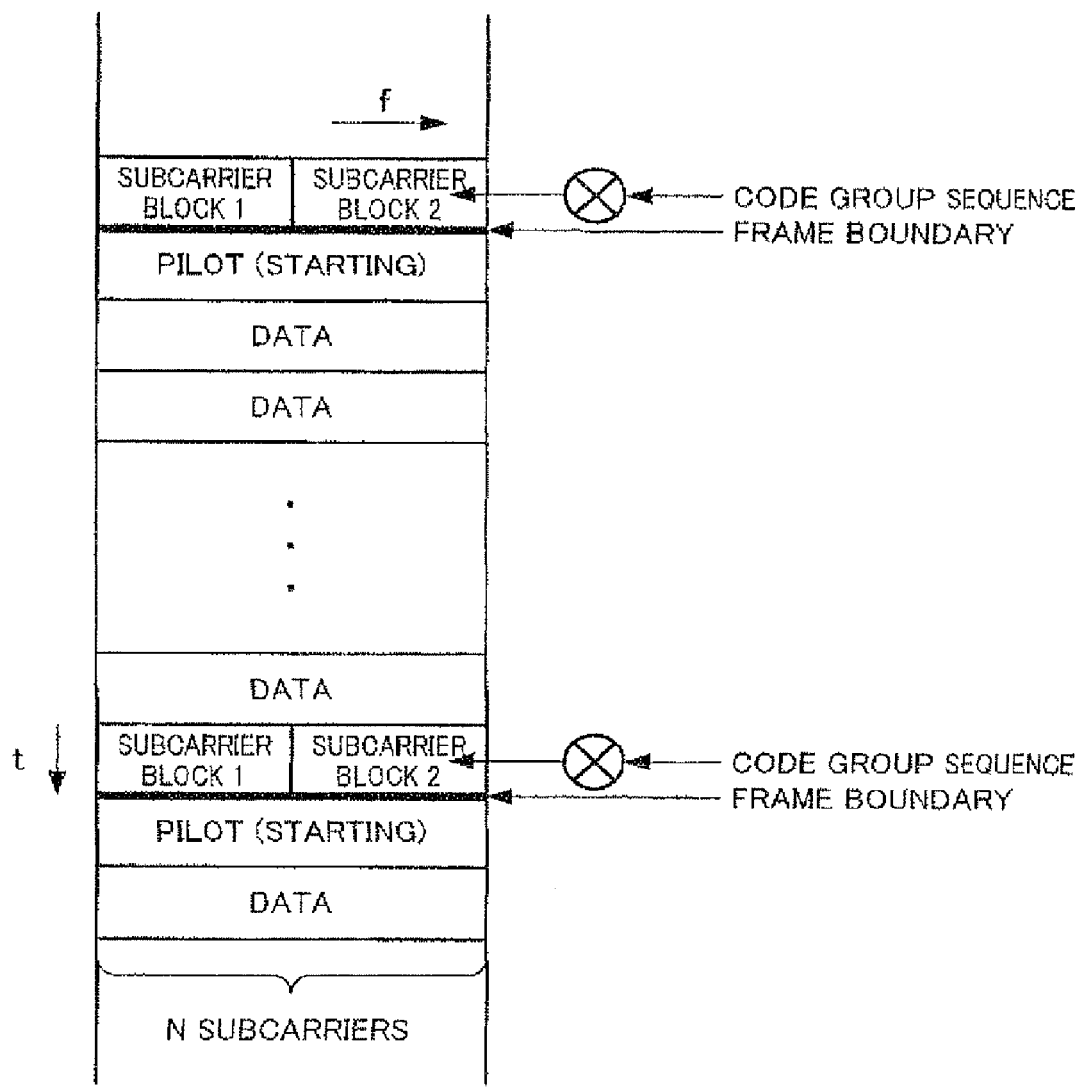
FIG. 12 is a drawing explaining a frame configuration of Embodiment 3.

To simplify the description, in FIG. 12 subcarriers are divided into two subcarrier blocks corresponding to the number of code group sequences contained in a code group sequence set. However, this is not a limitation, and subcarriers may also be divided into two subcarrier groups. That is to say, subcarriers by which each code group sequence is multiplied need not be subcarrier blocks that are consecutive in the frequency domain, but may also be arranged in a skipping fashion. In this description, a subcarrier block is one form of subcarrier group. Also, if a code group sequence set corresponds to n code group sequences, the number of subcarrier groups in FIG. 12 will be n.

Frame configuration section 420 then outputs an OFDM symbol with an OFDM symbol that is subcarrier number N symbols as a unit.

Figure 13:
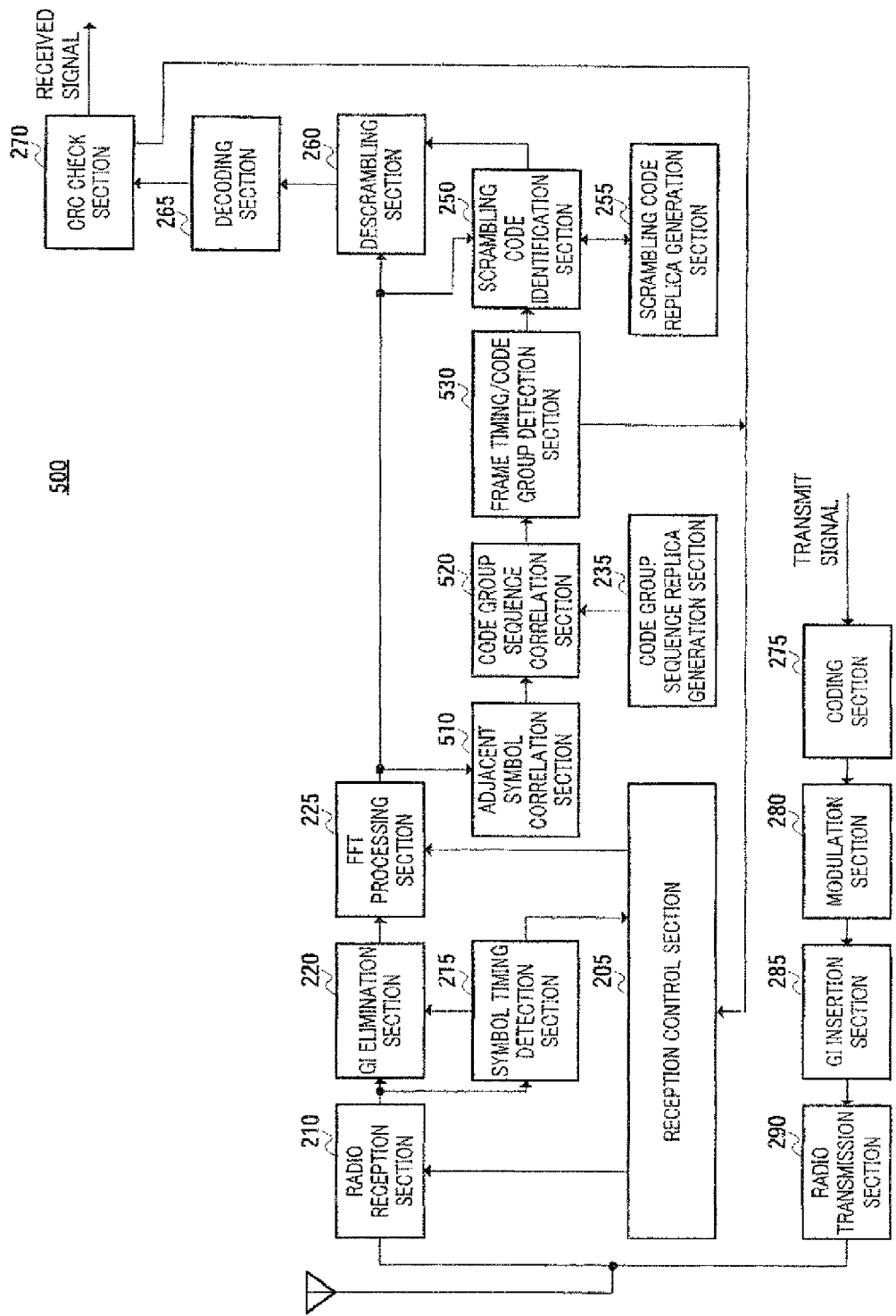
FIG. 13 is a block diagram showing the configuration of a mobile station apparatus according to Embodiment 3.

As shown in FIG. 13, a mobile station apparatus 500 of Embodiment 3 has an adjacent symbol correlation section 510, a code group sequence correlation section 520, and a frame timing/code group detection section 530.

Adjacent symbol correlation section 510 has a signal that has undergone FFT processing as input from FFT processing section 225, and calculates a correlation sequence with correlation calculated between two temporally consecutive OFDM symbols. This correlation sequence calculation is performed over n frames in order to perform subsequent averaging. A calculated correlation sequence is then output to code group sequence correlation section 520.

Code group sequence correlation section 520 has a correlation sequence calculated by adjacent symbol correlation section 510 and code group sequences from code group sequence replica generation section 235 as input, and calculates correlations between the correlation sequence and all the code group sequences. Here, unlike in Embodiment 1, correlations are calculated on a subcarrier-block by subcarrier-block basis. That is to say, in Embodiment 3, the code group sequence length is half that in Embodiment 1.

This correlation calculation is performed for n frames, and code group sequence correlation section 520 calculates an average for n correlation values calculated from a correlation sequence and code group sequences calculated from OFDM symbols having the same temporal position in the frames. Then code group sequence correlation section 520 outputs all the correlation values averaged on a subcarrier-block by subcarrier-block basis to frame timing/code group detection section 530.

Frame timing/code group detection section 530 has correlation values averaged on a subcarrier-block by subcarrier-block basis as input from code group sequence correlation section 520, and detects the maximum correlation value giving the largest value for each subcarrier block. Then frame timing/code group detection section 530 stores the symbol timing (in a virtual frame) at which the maximum correlation value is calculated and the code group sequences used in multiplication when that maximum correlation value is calculated.

Also, frame timing/code group detection section 530 determines whether or not timings (in a frame) at which maximum correlation values detected on a subcarrier-block by subcarrier-block basis are calculated coincide.

If the result of the determination is that timings in a frame at which maximum correlation values detected on a subcarrier-block by subcarrier-block basis are calculated do not coincide, frame timing/code group detection section 530 determines that frame timing detection in the second step of the initial cell search has failed, and outputs a second step failure indicator that the second step has failed to reception control section 205.

On the other hand, if the result of the determination is that timings (in a frame) at which maximum correlation values detected on a subcarrier-block by subcarrier-block basis are calculated coincide, frame timing/code group detection section 530 determines that second-step frame timing detection has succeeded, outputs the detected frame timing to reception control section 205, and also outputs code group sequence indicator identifying the detected code group sequences to scrambling code identification section 250.

Figure 14:
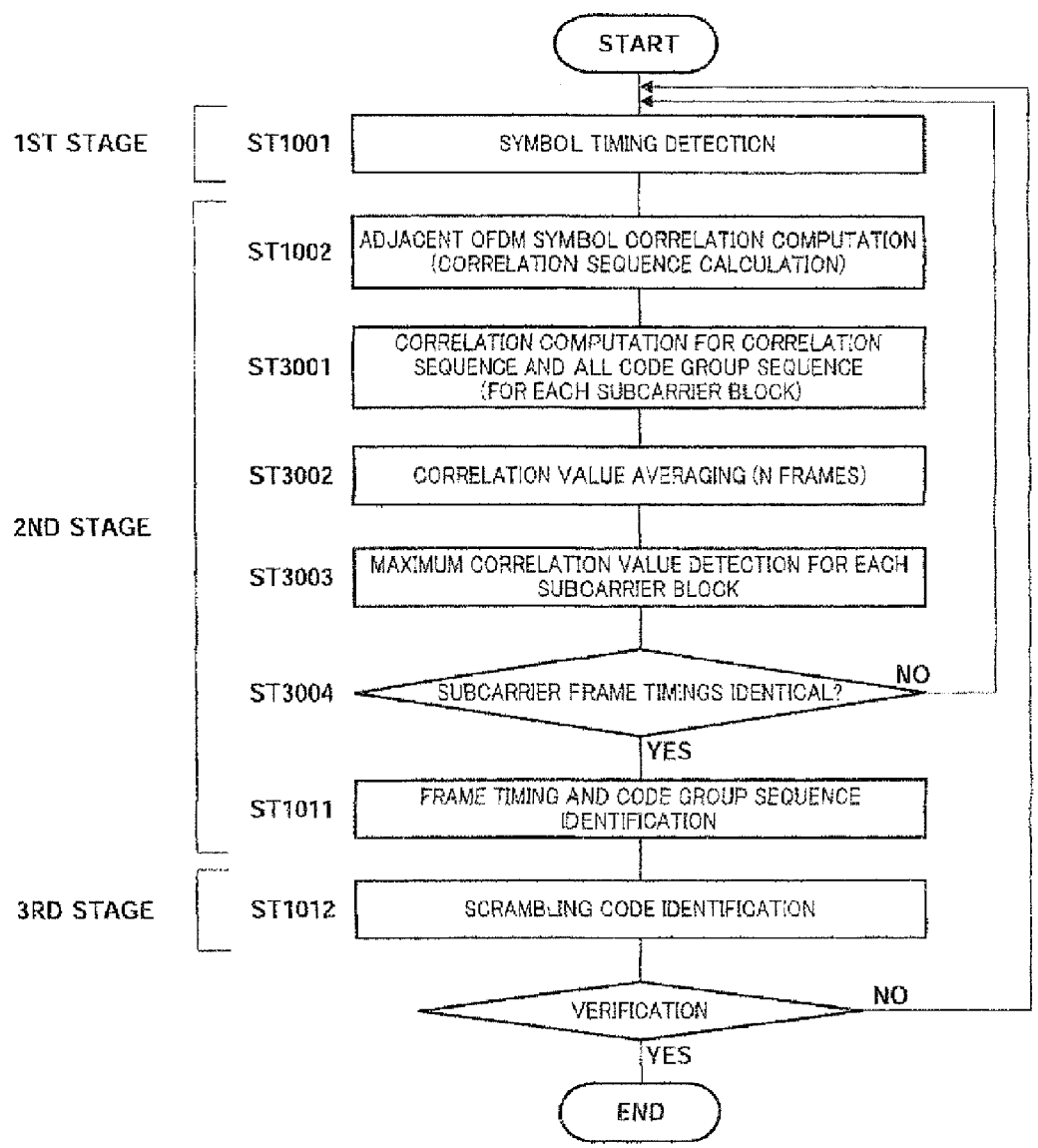
FIG. 14 is a flowchart explaining the operation of the mobile station apparatus in FIG. 13.

The operation of mobile station apparatus 500 having the above-described configuration will now be explained with reference to FIG. 14.

In step ST3001, code group sequence correlation section 520 has a correlation sequence calculated by adjacent symbol correlation section 510 and code group sequences from code group sequence replica generation section 235 as input, and calculates correlations between the correlation sequence and all the code group sequences. Here, this correlation calculation is performed on a subcarrier-block by subcarrier-block basis.

In step ST3002, code group sequence correlation section 520 performs averaging for each identical subcarrier block for n correlation values calculated between a correlation sequence calculated from OFDM symbols at the same temporal position in a frame and code group sequences.

In step ST3003, frame timing/code group detection section 530 has correlation values averaged on a subcarrier-block by subcarrier-block basis as input from code group sequence correlation section 520, and detects the maximum correlation value for each subcarrier block.

In step ST3004, frame timing/code group detection section 530 determines whether or not timings at which maximum correlation values detected on a subcarrier-block by subcarrier-block basis are calculated coincide.

If the result of the determination is that timings at which maximum correlation values detected on a subcarrier-block by subcarrier-block basis are calculated do not coincide (step ST3004: NO), frame timing/code group detection section 530 determines that frame timing detection in the second step of the initial cell search has failed, and returns to step ST1001 by outputting a second step failure indicator that the second step has failed to reception control section 205.

On the other hand, if the result of the determination is that timings at which maximum correlation values detected on a subcarrier-block by subcarrier-block basis are calculated coincide (step ST3004: YES), frame timing/code group detection section 530 determines that second-step frame timing detection has succeeded, and the relevant frame timing and code group sequences are deemed to have been identified (step ST1011). Then frame timing/code group detection section 530 outputs the detected frame timing to reception control section 205, and also outputs code group sequence indicator identifying the detected code group sequences to scrambling code identification section 250.

In the above description, it has been assumed that there is orthogonality between a scrambling code and code group sequences that are component of a code group sequence set.

However, in this embodiment, code group sequence used in multiplication differs for each subcarrier block, and therefore orthogonality between code group sequences is not necessarily essential.

Thus, according to Embodiment 3, a base station apparatus 400 is equipped with: a frame configuration section 420 that forms a frame in which a plurality of subcarriers are divided into a plurality of groups, and, for each group, a pilot symbol multiplied, one at a time, by (code group) sequences contained in a (code group) sequence set corresponding to a base station scrambling code assigned to that apparatus is arranged at at least the start or end; and a radio transmission section 155 that transmits the formed frame.

A mobile station that receives an above-described frame can detect frame timing from the position of a pilot symbol contained in that frame, and furthermore scrambling code candidates are narrowed down to the number of combinations of (code group) sequences contained in a (code group) sequence set at the most by detecting a (code group) sequence multiplied by each subcarrier block of a pilot symbol due to the fact that a base station scrambling code and a (code group) sequence set containing a plurality of (code group) sequences are mutually associated, with the result that cell search processing can be alleviated, and a base station scrambling code corresponding to such a spreading code set candidate can be fast identified.

Also, according to Embodiment 3, a mobile station apparatus 500 is equipped with: a radio reception section 210 that receives a frame in which a plurality of subcarriers are divided into a plurality of groups, and, for each subcarrier group, a pilot symbol multiplied, one at a time, by (code group) sequences contained in a (code group) sequence set corresponding to a base station scrambling code is arranged at at least the start or end; a correspondence table in which the base station scrambling code and the (code group) sequence set are mutually associated (see FIG. 4); a code group sequence correlation section 520 (adjacent symbol correlation section 510) serving as a correlation section that calculates a correlation sequence by sequentially multiplying all (code group) sequence candidates by each subcarrier group; a frame timing/code group detection section 530 that detects, for each subcarrier group, frame timing and the (code group) sequences multiplied by the pilot symbol based on a correlation value calculated by the correlation section; and a scrambling code identification section 250 that identifies scrambling code candidates corresponding to a combination of detected (code group) sequences from the correspondence table, and detects the base station scrambling code from among the scrambling code candidates.

By this means, frame timing can be detected from the position of a pilot symbol contained in a received frame, and furthermore candidates are narrowed down to a (code group) sequence set of the number of combinations of (code group) sequences contained in a (code group) sequence set at the most by detecting a (code group) sequence multiplied by each subcarrier group of a pilot symbol due to the fact that a base station scrambling code is associated as a combination of a plurality of (code group) sequences, a base station scrambling code corresponding to such a (code group) sequence set candidate can be fast identified, and initial cell search processing can be alleviated.

Adjacent symbol correlation section 510 and code group sequence correlation section 520 serving as the above-described correlation section calculate correlations by sequentially multiplying all the (code group) sequence candidates by a correlation value between temporally adjacent symbols in a frame, and frame timing/code group detection section 530 detects the maximum correlation value in each subcarrier group from correlation values calculated by the correlation section, and detects the timing at which that detected maximum correlation value is calculated and the code group sequence used in multiplication when the detected maximum correlation value of each subcarrier group is calculated as the frame timing and the (code group) sequence multiplied by each subcarrier group of the pilot symbol.

(Embodiment 4)

In Embodiment 3, correlation is calculated for correlation values of adjacent OFDM symbols for each code group sequence and the calculated correlation values are averaged over n frames for each code group sequence and subcarrier block, after which identification is performed of the code group sequences used in multiplication when the largest correlation value is calculated on a subcarrier-block by subcarrier-block basis. In contrast, in Embodiment 4, correlation values calculated by calculating correlations for a correlation sequence of adjacent OFDM symbols for each code group sequence and subcarrier block are added for each code group sequence set, the sum of correlation values are averaged over n/2 frames, and then the code group sequence set by which multiplication is performed in order to calculate the largest correlation value among these averaged correlation values is identified. By this means, the SN ratio of correlation values within one OFDM symbol is improved, and therefore the scope of averaging processing performed over n frames is halved, making a faster cell search possible. Also, since the SN ratio of OFDM received symbols can be increased by performing adding processing, values with the same high degree of reliability as in Embodiment 3 can be calculated even though the number of frames for which averaging processing is performed is halved, and a faster cell search can be implemented.

Figure 15:
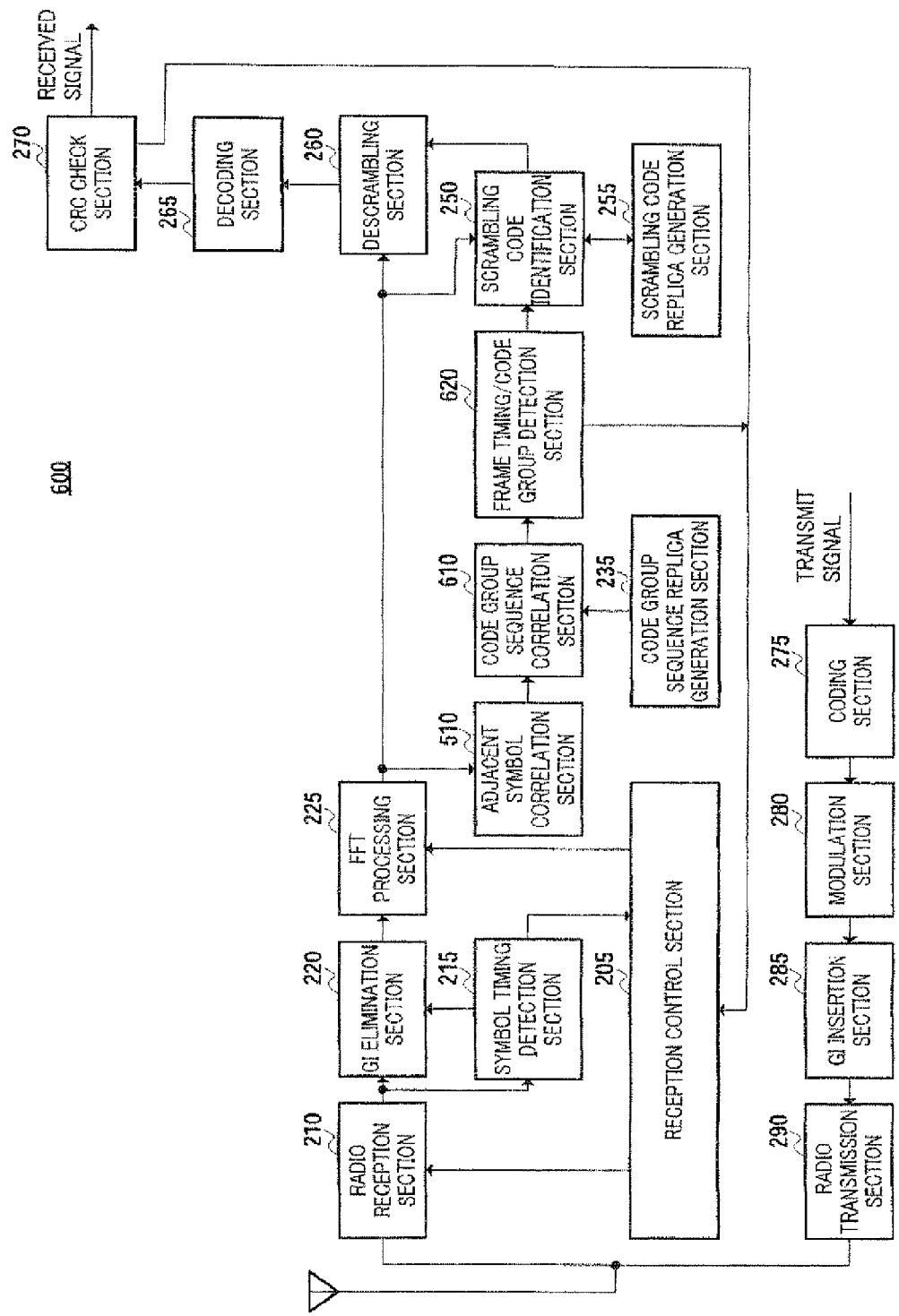
FIG. 15 is a block diagram showing the configuration of a mobile station apparatus according to Embodiment 4.

As shown in FIG. 15, a mobile station apparatus 600 of Embodiment 4 has a code group sequence correlation section 610 and a frame timing/code group detection section 620.

Code group sequence correlation section 610 has a correlation sequence calculated by adjacent symbol correlation section 510 and code group sequences from code group sequence replica generation section 235 as input, and calculates correlations between the correlation sequence and all the code group sequences. Here, correlation sequence calculation and correlation between the correlation sequence and all the code group sequences are performed on a subcarrier-block by subcarrier-block basis.

Then code group sequence correlation section 610 adds correlation values calculated by the above correlation calculation by means of combinations corresponding to code group sequence sets. Code group sequence correlation section 610 then averages the sum of correlation values calculated by this addition for each code group sequence set over n/2 frames. Then code group sequence correlation section 610 outputs all the averaged sum of correlation values to frame timing/code group detection section 620.

Frame timing/code group detection section 620 has averaged sum of correlation values as input from code group sequence correlation section 610, and detects the maximum sum of correlation values. Then frame timing/code group detection section 620 identifies the timing at which the maximum sum of correlation values is calculated and the code group sequence set used in multiplication when the maximum sum of correlation values is calculated.

Frame timing/code group detection section 620 then outputs information identifying the identified code group sequence set to scrambling code identification section 250. The information identifying the code group sequence set may be, for example, code group sequence indicator identifying code group sequences composing the code group sequence set, or a scrambling code number corresponding to the code group sequence set.

In this embodiment, it is basically necessary to identify code group sequences from a sum of correlation values multiplied by a plurality of code group sequences, and it is therefore necessary to maintain orthogonality between code group sequences.

Thus, according to Embodiment 4, a mobile station apparatus 600 is equipped with: a radio reception section 210 that receives a frame in which a, plurality of subcarriers are divided into a plurality of groups, and, for each subcarrier group, a pilot symbol multiplied, one at a time, by (code group) sequences contained in a (code group) sequence set corresponding to a base station scrambling code is arranged at at least the start or end; a correspondence table in which the base station scrambling code and the (code group) sequence set are mutually associated (see FIG. 4); an adjacent symbol correlation section 510 and a code group sequence correlation section 610 serving as a correlation section that calculates correlations by multiplying all candidates of the (code group) sequences by a correlation sequence between temporally adjacent OFDM symbols in the frame for each subcarrier group and calculates a sum of correlation values by adding the calculated correlation values according to combinations corresponding to the (code group) sequence set; a frame timing/code group detection section 620 that specifies a maximum sum of correlation values from the sum of correlation values and detects a timing in the frame at which the specified maximum sum of correlation values is calculated and the (code group) sequences multiplied upon calculating the specified maximum sum of correlation values as the frame timing and the (code group) sequences multiplied by the pilot symbol; and a scrambling code identification section 250 that determines scrambling code candidates corresponding to the (code group) sequence set containing the detected (code group) sequences from the correspondence table, and detects the base station scrambling code from among the scrambling code candidates.

By this means, the SN ratio of received symbols can be increased by performing correlation value adding processing, enabling values with a high degree of reliability to be calculated even though the number of frames for which averaging is performed is halved when averaging processing is performed over a plurality of frames, and making it possible to implement a faster cell search.

(Embodiment 5)

In Embodiment 3, correlation is calculated for a correlation sequence of adjacent OFDM symbols for each code group sequence and the calculated correlation values are averaged over n frames for each code group sequence and subcarrier block, after which identification is performed of the code group sequences used in multiplication when the largest correlation value is calculated on a subcarrier-block by subcarrier-block basis. In contrast, in Embodiment 5, a scrambling code can also be identified at the point in time at which a per-subcarrier code group sequence is identified by further mutually associating subcarrier blocks and code group sequences. That is to say, the third step of a cell search can be omitted.

Figure 16:
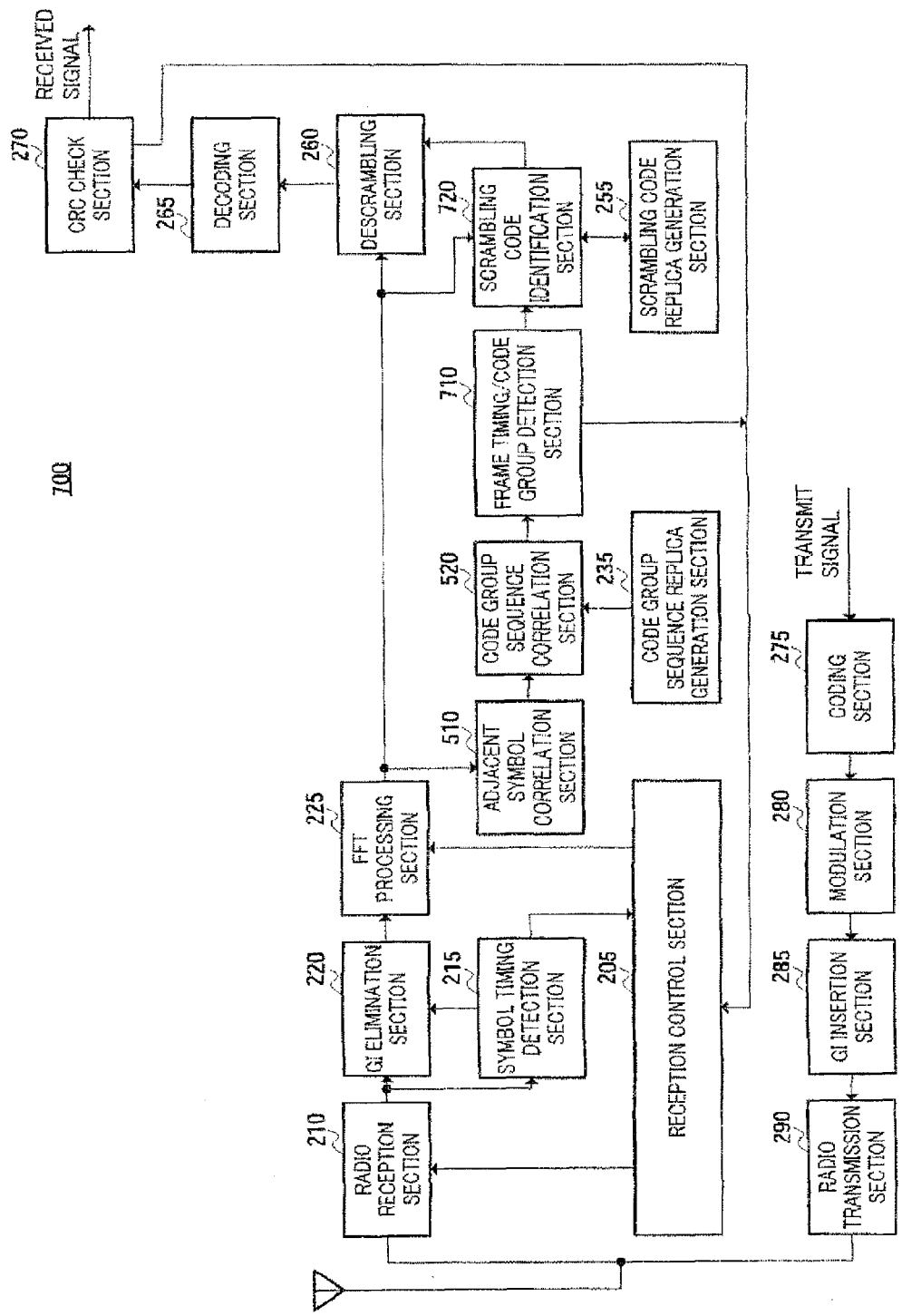
FIG. 16 is a block diagram showing the configuration of a mobile station apparatus according to Embodiment 5.

As shown in FIG. 16, a mobile station apparatus 700 of Embodiment 5 has a frame timing/code group detection section 710 and a scrambling code identification section 720.

Frame timing/code group detection section 710 has correlation values averaged on a subcarrier-block by subcarrier-block basis as input from code group sequence correlation section 520, and detects the maximum correlation value that gives the largest value for each subcarrier block. Then frame timing/code group detection section 710 stores the timing in a frame at which the maximum correlation value is calculated and the code group sequences used in multiplication when the maximum sum of correlation values is calculated.

Also, frame timing/code group detection section 710 determines whether or not timings in a frame at which maximum correlation values detected on a subcarrier-block by subcarrier-block basis are calculated coincide.

If the result of the determination is that timings in a frame at which maximum correlation values detected on a subcarrier-block by subcarrier-block basis are calculated do not coincide, frame timing/code group detection section 710 determines that frame timing detection in the second step of the initial cell search has failed, and outputs a second step failure indicator that the second step has failed to reception control section 205.

On the other hand, if the result of the determination is that timings in a frame at which maximum correlation values detected on a subcarrier-block by subcarrier-block basis are calculated coincide, frame timing/code group detection section 710 determines that second-step frame timing detection has succeeded, outputs the detected frame timing to reception control section 205, and also outputs code group sequence indicator identifying the detected code group sequences, and indicator as to the subcarrier block in which that code group sequence is detected, to scrambling code identification section 720 in mutually associated form.

Scrambling code identification section 720 references the table shown in FIG. 17 and identifies a scrambling code corresponding to the code group sequence indicator and subcarrier block indicator from frame timing/code group detection section 710, causes scrambling code replica generation section 255 to generate the identified scrambling code, and outputs this to descrambling section 260. In this embodiment, a base station apparatus multiplies a code group sequence set—that is, code group sequences stipulated for each subcarrier group—based on the base station's own scrambling code number in accordance with the table in FIG. 17.

Figure 18:
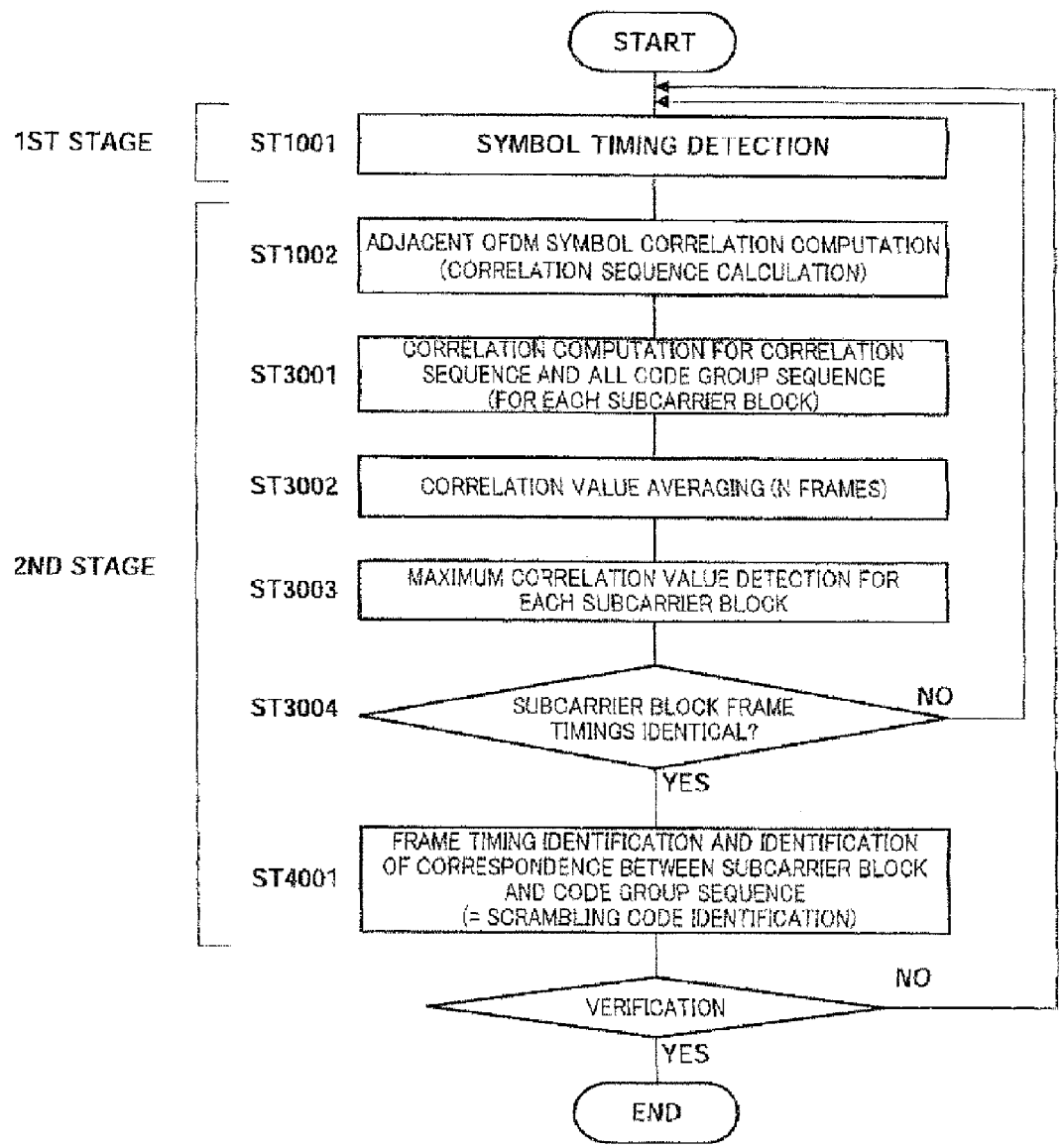
FIG. 18 is a flowchart explaining the operation of the mobile station apparatus in FIG. 16.

The operation of mobile station apparatus 700 having the above-described configuration will now be explained with reference to FIG. 18.

If timings in a frame at which maximum correlation values detected on a subcarrier-block by subcarrier-block basis are calculated coincide (step ST3004: YES), in step ST4001 frame timing/code group detection section 710 determines that second-step frame timing detection has succeeded and identifies the frame timing, and scrambling code identification section 720 references the table and identifies a scrambling code corresponding to the code group sequence indicator and subcarrier block indicator from frame timing/code group detection section 710.

In the above description, it has been assumed that there is orthogonality between a scrambling code and code group sequences that are component of a code group sequence set. However, in this embodiment, subcarrier blocks are already orthogonal, and therefore orthogonality between code group sequences is not necessarily essential.

Thus, according to Embodiment 5, a mobile station apparatus 700 is equipped with: a radio reception section 210 that receives a frame in which a plurality of subcarriers are divided into a plurality of groups, and, for each subcarrier group, a pilot symbol multiplied, one at a time, by (code group) sequences contained in a (code group) sequence set corresponding to a base station scrambling code is arranged at at least the start or end; a correspondence table in which the base station scrambling code, the (code group) sequence set and indicator for the subcarrier group by which (code group) sequences contained in that (code group) sequence set is multiplied are mutually associated (see FIG. 17); a code group sequence correlation section 520 serving as a correlation section that calculates correlations by sequentially multiplying all (code group) sequences by each subcarrier group; and a frame timing/code group detection section 710 and scrambling code identification section 720 that detect frame timing and (code group) sequences multiplied by the pilot symbol based on per-subcarrier-group correlation values calculated by the correlation section, and identify the base station scrambling code using the correspondence table based on the detected (code group) sequences and indicator for the group in which that (code group) sequences are detected.

By this means, subcarrier blocks and code group sequences are further mutually associated as compared with FIG. 4, enabling a scrambling code also to be identified at the point in time at which a code group sequence multiplied on a subcarrier-block by subcarrier-block basis is identified. As a result, the step corresponding to the third step of a conventional cell search can be omitted, enabling initial cell search processing to be alleviated, and a still faster cell search to be implemented.

(Embodiment 6)

In Embodiment 5, correlation is calculated for correlation values of adjacent OFDM symbols for each code group sequence and the calculated correlation values are averaged over n frames for each code group sequence and subcarrier block, after which identification is performed of the code group sequence used in multiplication when the largest correlation value is calculated on a subcarrier-block by subcarrier-block basis. In contrast, in Embodiment 6, correlation values calculated by calculating correlations for a correlation sequence of adjacent OFDM symbols for each code group sequence and subcarrier block are added for each code group sequence set, taking the correspondence between a subcarrier block and code group sequence into consideration, and the sum of correlation values are averaged over n/2 frames, and then the code group sequence set by which multiplication is performed in order to calculate the largest correlation value among these averaged correlation values is identified. By this means, the SN ratio of correlation values within one OFDM symbol is improved, and therefore the scope of averaging processing performed over n frames is halved, making a faster cell search possible. Also, since the SN ratio of OFDM received symbols can be increased by performing adding processing, values with the same high degree of reliability as in Embodiment 5 can be calculated even though the number of frames for which averaging processing is performed is halved, and a faster cell search can be implemented. "Adding for each code group sequence set, taking the correspondence between a subcarrier block and code group sequence into consideration" means that, even if the combination of code group sequences contained in code group sequence sets is the same, if the correspondence between code group sequences and subcarrier blocks is different, addition is performed with the code group sequence set treated as different code group sequence sets.

As shown in FIG. 19, a mobile station apparatus 800 of Embodiment 6 has a code group sequence correlation section 810 and a frame timing/code group detection section 820.

Code group sequence correlation section 810 has a correlation sequence calculated by adjacent symbol correlation section 510 and code group sequences from code group sequence replica generation section 235 as input, and calculates correlations between the correlation sequence and all the code group sequences. Here, correlation sequence calculation and correlation calculation between the correlation sequence and all the code group sequences are performed on a subcarrier-block by subcarrier-block basis.

Then code group sequence correlation section 810 adds correlation values calculated by the above correlation calculation for each code group sequence set, taking the correspondence between a subcarrier block and code group sequence into consideration. Code group sequence correlation section 810 then averages the sum of correlation values calculated by this addition for each code group sequence set taking the correspondence between a subcarrier block and code group sequence into consideration over n/2 frames. Then code group sequence correlation section 810 outputs all the averaged sum of correlation values to frame timing/code group detection section 820.

Frame timing/code group detection section 820 has averaged sum of correlation values as input from code group sequence correlation section 810, and detects the maximum sum of correlation values. Then frame timing/code group detection section 820 identifies the timing at which the maximum sum of correlation values is calculated and the code group sequence set (taking the correspondence between a subcarrier block and code group sequences into consideration) used in multiplication when the maximum sum of correlation values is calculated.

Frame timing/code group detection section 820 then outputs code group sequence indicator identifying the detected code group sequences, and indicator as to the subcarrier block corresponding thereto, to scrambling code identification section 720 in mutually associated form.

In this embodiment, it is basically necessary to identify a code group sequence from a sum of correlation values multiplied by a plurality of code group sequences, and it is therefore necessary to maintain orthogonality between code group sequences.

Thus, according to Embodiment 6, a mobile station apparatus 800 is equipped with: a radio reception section 210 that receives a frame in which a plurality of subcarriers are divided into a plurality of groups, and, for each subcarrier group, a pilot symbol multiplied, one at a time, by (code group) sequences contained in a (code group) sequence set corresponding to a base station scrambling code is arranged at at least the start or end; a correspondence table in which the base station scrambling code, the (code group) sequence set and indicator for the subcarrier group by which (code group) sequences contained in that (code group) sequence set is multiplied are mutually associated (see FIG. 17); an adjacent symbol correlation section 510 and a code group sequence correlation section 810 serving as a correlation section that calculates correlations by multiplying all candidates of the (code group) sequence by a correlation sequence between temporally adjacent OFDM symbols in the frame for each subcarrier group and calculates a sum of correlation values by adding the calculated correlation values for each (code group) sequence set specified by correspondence between the subcarrier groups and the (code group) sequences corresponding to the (code group) sequence set; a frame timing/code group detection section 820 that specifies a maximum sum of correlation values from the sum of correlation values, and identifies a timing in the frame at which the identified maximum sum of correlation values is calculated and the (code group) sequence set for which the identified maximum sum of correlation values is calculated; and a scrambling code identification section 720 that determines the base station scrambling code corresponding to the identified (code group) sequence set from the correspondence table.

By this means, the SN ratio of received symbols can be increased by performing correlation value adding processing, enabling values with a high degree of reliability to be calculated even though the number of frames for which averaging is performed is halved when averaging processing is performed over a plurality of frames, and making it possible to implement a faster cell search.

(Other Embodiments)

In Embodiments 1 through 4, when a base station scrambling code is identified in the third step of an initial cell search, a pilot symbol by which group code sequences have not been multiplied and only a base station scrambling code has been multiplied is described as being used. However, the present invention is not limited to this case, and a pilot symbol by which group code sequences have been multiplied (a pilot symbol arranged at the start of a frame in each embodiment) can be used.

As a concrete example, a case in which this is applied to Embodiment 1 will be described with reference to FIG. 3.

In this case, when the current state of mobile station apparatus 200 is the third step of a cell search, FFT processing section 225 has as input an output destination directive signal indicating that scrambling code identification section 250 is the output destination, and outputs an OFDM symbol containing a pilot signal that has undergone FFT processing and containing a pilot signal that is arranged at the end of a frame to scrambling code identification section 250.

Scrambling code identification section 250 performs complex conjugate multiplication of code group sequences identified in the second step, and extracts a pilot signal by which only a scrambling code is multiplied.

The present application is based on Japanese Patent Application No. 2005-198608 filed on Jul. 7, 2005, the entire content of which is expressly incorporated herein by reference.

Industrial Applicability

A base station apparatus and mobile station apparatus of the present invention are useful in enabling cell search processing to be alleviated.

The invention claimed is:

1. A base station comprising:
    an arranging unit configured to arrange a first signal generated with first information and a second signal generated with second information in different subcarriers, respectively, of a first symbol, and to arrange a third signal generated with third information in a second symbol other than the first symbol, the first information and the second information being for simultaneous use by a mobile station to determine scrambling code candidates, and the third information being for use by the mobile station to select a scrambling code from the scrambling code candidates; and
    a transmitting unit configured to transmit the first symbol and the second symbol.

2. The base station according to claim 1, wherein the arranging unit arranges the first signal in first subcarriers included in a first subcarrier group and the second signal in second subcarriers included in a second subcarrier group.

3. The base station according to claim 2, wherein the first subcarriers included in the first subcarrier group are allocated in a skipping fashion and the second subcarriers included in the second subcarrier group are allocated in a skipping fashion.

4. A transmitting method comprising:
    arranging a first signal generated with first information and a second signal generated with second information in different subcarriers, respectively, of a first symbol,
    arranging a third signal generated with third information in a second symbol other than the first symbol, the first information and the second information being for simultaneous use by a mobile station to determine scrambling code candidates, and the third information being for use by the mobile station to select a scrambling code from the scrambling code candidates; and
    transmitting the first symbol and the second symbol.

5. The transmitting method according to claim 4, further comprising arranging the first signal in first subcarriers included in a first subcarrier group and arranging the second signal in second subcarriers included in a second subcarrier group.

6. The transmitting method according to claim 5, wherein the first subcarriers included in the first subcarrier group are allocated in a skipping fashion and the second subcarriers included in the second subcarrier group are allocated in a skipping fashion.

7. A base station comprising:
    an arranging unit configured to arrange a first signal generated with first information and a second signal generated with second information in different subcarriers, respectively, of a first symbol, and to arrange a third signal generated with third information in a second symbol other than the first symbol, the first information and the second information being for use by a mobile station to determine scrambling code candidates, and the third information being for use by the mobile station to select a scrambling code from the scrambling code candidates,
    wherein the scrambling code candidates are directly determined from both of the first information and the second information; and
    a transmitting unit configured to transmit the first symbol and the second symbol.

8. The base station according to claim 7, wherein the arranging unit arranges the first signal in first subcarriers included in a first subcarrier group and the second signal in second subcarriers included in a second subcarrier group.

9. The base station according to claim 8, wherein the first subcarriers included in the first subcarrier group are allocated in a skipping fashion and the second subcarriers included in the second subcarrier group are allocated in a skipping fashion.

* * * * *